United States Patent [19]

Newberger et al.

[11] Patent Number: 5,258,941
[45] Date of Patent: Nov. 2, 1993

[54] APPARATUS FOR UTILIZING A DISCRETE FOURIER TRANSFORMER TO IMPLEMENT A DISCRETE COSINE TRANSFORMER

[75] Inventors: Edward Newberger, 90 Huntington Ave. - Apt. #104, Buffalo, N.Y. 14214; David Sher, Amherst, N.Y.

[73] Assignee: Edward Newberger, Amherst, N.Y.

[21] Appl. No.: 806,671

[22] Filed: Dec. 13, 1991

[51] Int. Cl.⁵ .................................... G06F 15/332
[52] U.S. Cl. .................................... 364/725
[58] Field of Search .................................... 364/725

[56] References Cited

U.S. PATENT DOCUMENTS

| | | | |
|---|---|---|---|
| 4,385,363 | 5/1983 | Widergren | 364/725 |
| 4,873,658 | 10/1989 | Cambonie | 364/725 |
| 5,053,985 | 10/1991 | Friedlander et al. | 364/725 |
| 5,117,381 | 5/1992 | Juri et al. | 364/725 |

OTHER PUBLICATIONS

Tseng et al., "On Computing the Discrete Cosine Transform" *IEEE Trans. on Computers* vol. C-27, No. 10 pp. 966–968 Oct. 1978.

*Primary Examiner*—David H. Malzahn
*Attorney, Agent, or Firm*—Howard J. Greenwald

[57] ABSTRACT

An apparatus for utilizing a discrete Fourier transformer to implement a discrete cosine transformer is disclosed. This apparatus contains a first scrambler for rearranging a first real input data stream, a second scrambler for rearranging a second real input data stream, and a convertor for converting a complex data stream output from a Discrete Fourier Transformer into two streams of discrete cosine transformed data.

12 Claims, 8 Drawing Sheets

APPARATUS FOR UTILIZING A DISCRETE FOURIER TRANSFORMER TO IMPLEMENT A DISCRETE COSINE TRANSFORMER

FIELD OF THE INVENTION

A device for utilizing discrete Fourier transform technology to implement discrete cosine transform technology is disclosed.

BACKGROUND OF THE INVENTION

The Discrete Cosine Transform ("DCT") is well known to those skilled in the art. In some applications, for example image compression (the reduction of the amount of storage necessary to hold an image ), the Discrete Cosine Transform is extensively used. The DCT represents an input sequence of N real numbers as a weighted sum of N distinct cosine curves. Each of these N cosine curves has a different frequency (the number of times the curve completes a cycle from 1 through 0, −1, 0 and back to 1 as the independent variable ranges from 0 to N). The output of a DCT is the collection of these N weights.

The DCT represents the input sequence as a weighted sum of periodic curves; the word "periodic" means that, after a certain real number p (the period), the values repeat so that the value at position p is the same as the value at the initial position O, and in general the value at position p+x is the same as the value at position x. Thus the DCT assumes that the input sequence of N real numbers is a part of an infinite periodic sequence of real numbers.

The DCT differs from the Discrete Fourier Transform, the most popular data sequence transformation technology, in the way in which the input sequence of N real numbers is a part of the infinite periodic sequence of real numbers.

The Discrete Fourier Transform("DFT") is a widely used signal processing and analysis concept; and sophisticated signal processing systems have been developed based upon its features. DFT devices are used in a great variety of fields such as, e.g., applied mechanics, sonics and acoustics, biomedical engineering, signal processing, instrumentation, radar, electromagnetics, communications, and the like. See, for example, pages 1-3 of E. Oran Brigham's "The Fast Fourier Transform and its Applications" (Prentice Hall, Englewood Cliffs, N.J., 1988).

One of the most important uses of transform technology is "filtering." Some applications of filtering are image enhancement, target detection in radar, refocusing, and image compression. The process of "filtering" is achieved by transforming a given input sequence, either with the DCT or DFT or perhaps some other Fourier type transform, modifying the transformed sequence, and then performing an inverse transform on the modified transformed sequence.

To use the DFT or the DCT, one must regard the input sequence of N real numbers as embedded in an infinite periodic sequence of real numbers of period equal to N or 2N respectively. This "extended" periodic sequence is obtained in a natural way by cycling through the N point sequence over and over in both directions. For example, if N=4 and the 4 point sequence consists of the 4 numbers 0 1 2 and 3, then we may symbolically represent the extended input sequence for a DFT by:

| data values | 0  | 1  | 2  | 3 0 1 2 3 0 1 2 3 |
|---|---|---|---|---|
| indices | −4 | −3 | −2 | −1 0 1 2 3 4 5 6 7 | and we may symbolically represent the extended input sequence for a DCT by:

| data values | 0  | 1  | 2  | 3  | 3  | 2  | 1  | 0  | 0 | 1 | 2 | 3 | 3 | 2 | 1 | 0 |
|---|---|---|---|---|---|---|---|---|---|---|---|---|---|---|---|---|
| indices | −8 | −7 | −6 | −5 | −4 | −3 | −2 | −1 | 0 | 1 | 2 | 3 | 4 | 5 | 6 | 7 |

Note the data values corresponding to the zeroth and −1st indices of the extended DFT input sequence above (which from this point on may be referred to as the zeroth and −1st values of the extended DFT input sequence) and the data values corresponding to the zeroth and −1st indices of the extended DCT input sequence above (which from this point on may be referred to as the zeroth and −1st values of the extended DCT input sequence). In the DCT, the value of the zeroth element is automatically equal to the value of the −1st element. However, in the DFT, the zeroth element has a value of 0 and the −1st element has a value of 3 (These two values are not equal). Either extended input sequence is transformed appropriately, then filtered, and then inverse transformed. In the following discussion, this shall be referred to as the "filtered sequence". Typically the value of the kth element of this filtered sequence depends on values of elements of the corresponding extended input sequence near its kth element. Consequently, in the case of, for example, the DFT above, the value of the zeroth element of the filtered sequence depends on both the value of the zeroth element of G the input sequence and the value of the −1st element of the input sequence. But the value of the −1st element of the input sequence is equal to the value of the 3rd ( the last ) element of the input sequence. So the values of both endpoints of the original four point sequence significantly contribute to the value of the zeroth element of the filtered output sequence.

This anomaly does not happen for the DCT. For the extended DCT input sequence above, the value of the −1st element is by its very construction equal to the value of the zeroth element. So the value of the 3rd element (the last) does not significantly contribute to the value of the zeroth element of the filtered output.

Summarizing the above discussion, when filtering with the DCT the kth output depends on elements of the input sequence with indices near k. But in a DFT filtered output sequence the first elements will depend significantly on the last elements of the input sequence (likewise, the last elements of the filtered output sequence will depend significantly on the first elements of the input sequence). When the beginning and end of the input sequence differ significantly in value, the DFT filtered output will be distorted by this effect but the DCT filtered output will not suffer.

For the reasons specified above, the cosine transform is superior to the Fourier transform in many applications, such as image processing, image compression, and the like.

It is an object of this invention to provide a device for utilizing a discrete Fourier transformer to implement a discrete cosine transformer.

It is another object of this invention to provide a device for transforming a real input signal whose number of data points is not necessarily equal to a power of 2.

It is another object of this invention to provide a device for transforming two real discrete input signals simultaneously into their respective discrete cosine transforms.

It is another object of this invention to provide a device for utilizing a discrete Fourier transformer to implement a discrete cosine transformer which is adaptable to be used in any known discrete Fourier transform apparatus.

It is another object of this invention to provide a device for utilizing a discrete Fourier transformer to implement a discrete cosine transformer which devices operates at an extremely fast speed.

It is another object of this invention to provide a device suitable for utilizing a one-dimensional, discrete Fourier transformer to implement an efficient two- or three-dimensional cosine transformer.

It is another object of this invention to provide a relatively inexpensive device for utilizing a discrete Fourier transformer to implement a discrete cosine transformer.

SUMMARY OF THE INVENTION

In accordance with this invention, there is provided a device for utilizing a discrete forward Fourier transformer to implement a discrete forward cosine transformer. This device contains a scrambling apparatus, means for separating and sorting real and imaginary components from certain portions of a signal produced by a fast Fourier transformer, and a device for separating two discrete Fourier transform output signals and thereafter converting them into two discrete cosine transform form output signals. There is also provided a similar device for utilizing a discrete inverse Fourier transformer to implement a discrete inverse cosine transformer.

BRIEF DESCRIPTION OF THE DRAWINGS

The present invention will be more fully understood by reference to the following detailed description thereof, when read in conjunction with the attached drawings, wherein like reference numerals refer to like elements, and wherein.

DESCRIPTION OF THE PREFERRED EMBODIMENTS

Figure 1:
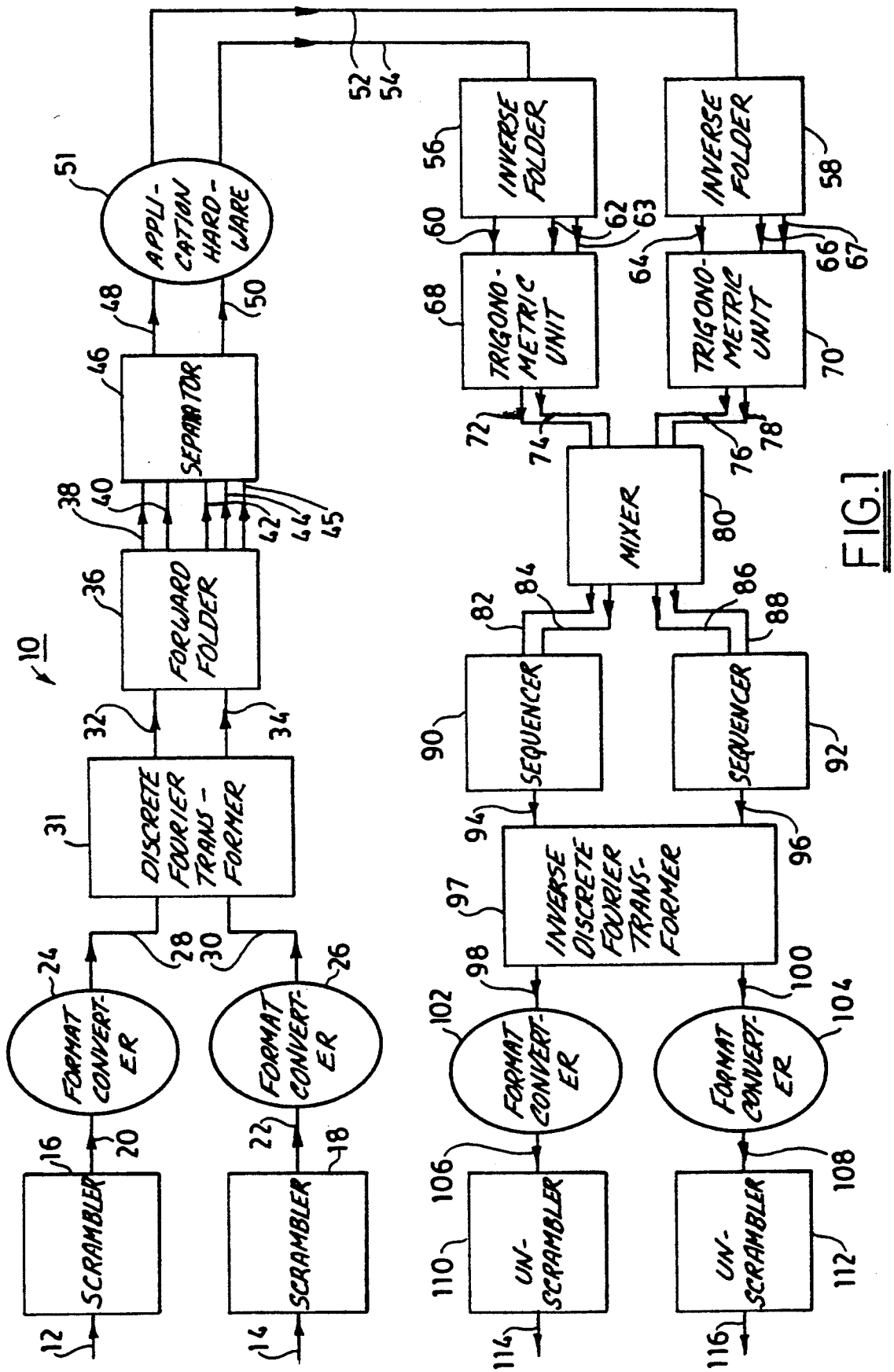
FIG. 1 is a flow diagram illustrating one preferred embodiment of the apparatus of applicant's invention.

FIG. 1 is a block diagram illustrating one preferred embodiment of applicants' invention. This preferred apparatus 10 is preferably comprised of a scrambler, a forward output processor, an inverse input processor, and an unscrambler.

Referring to FIG. 1, and in the particular embodiment illustrated therein, it will be seen that discrete cosine converter 10 is preferably comprised of scrambler 16, scrambler 18, format converter 24, format converter 26, forward folder 36, separator 46, inverse folder 56, inverse folder 58, trigonometric unit 68, trigonometric unit 70, mixer 80, sequencer 90, sequencer 92, format converter 102, format converter 104, unscrambler 110, and unscrambler 112.

Figure 2:
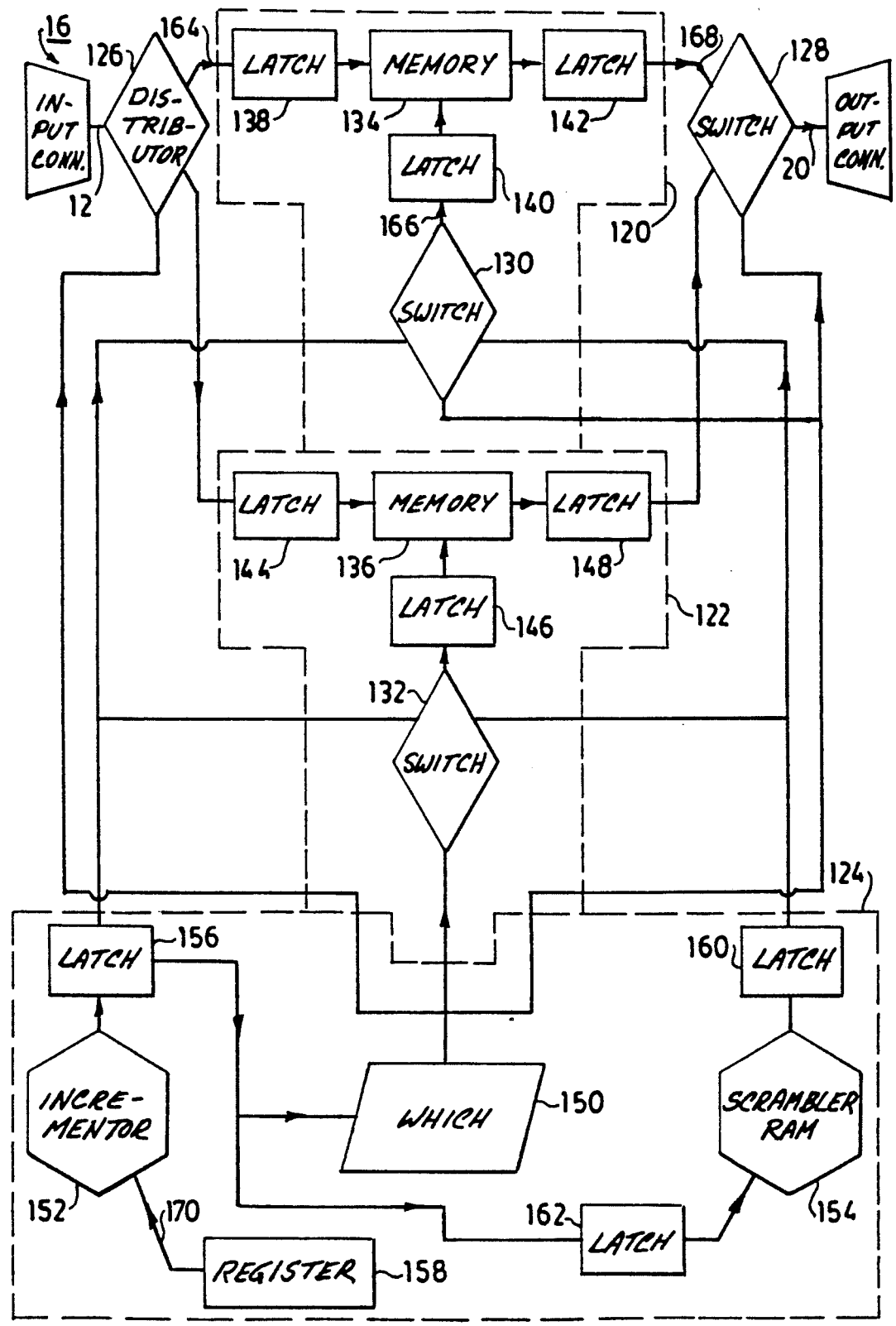
FIG. 2 is a block diagram illustrating one preferred embodiment of the scramblers 16 and/or 18 utilized in the apparatus of FIG. 1.

FIG. 2 illustrates a preferred embodiment of scrambler 16, which also may be used as scrambler 18. The function of scrambler 16 is to rearrange an input data stream fed to scrambler 16 via line 12. In a similar manner, scrambler 18 rearranges an input data stream fed to it via line 14 (see FIG. 1). The data fed via lines 12 and 14 is digitized input data which may be produced, e.g., by transducers or other digitizing devices.

It will be appreciated that, in applicants' preferred device, two scramblers are required (such as scramblers 16 and 18). These two scramblers scramble each of the two real input N point data streams (which are fed through lines 12 and 14, respectively) in formula 46, described elsewhere in the specification in a discussion of applicants' novel alogorithm; the scrambling is conducted in accordance with the prescription that is expressed in formulas 21, 20, and 17, which are also described elsewhere in this specification.

If a sequence of N real data items $x(0), x(1), x(2), \ldots, x(N-1)$ are input to scrambler apparatus 16 via line 12, the N real data items, $y(0), y(1), \ldots y(N-1)$, input in the previous N cycles are output via line 20 (see FIG. 1), but in a rearranged (scrambled) order. For example, if 4 real data items $x(0), x(1), x(2), x(3)$ are input, the output data stream consists of $y(0), y(2), y(3), y(1)$; if 6 real data items $x(0), x(1), x(2), x(3), x(4), x(5)$ are input, the output consists of $y(0), y(2), y(4), y(5), y(3), y(1)$; and if 8 real data items $x(0), x(1), x(2), x(3), x(4), x(5), x(6), x(7)$ are input, the output consists of $y(0), y(2), y(4), y(6), y(7), y(5), y(3), y(1)$.

In general, the output sequence can be arrived at by adjoining to the input sequence $y(0), y(1), y(2), \ldots, y(N-1)$ its reflection about $N-\frac{1}{2}$ and then selecting every other item from the 2N point sequence starting with item $y(0)$.

As is shown in the example below:

| (A) | 0 1 2 3 4 5 6 7 7 6 5 4 3 2 1 0 |
|---|---|

The scrambler 16 relies on double buffering to achieve input and output at the same rate, that is, for each cycle, one item of data enters the apparatus and another one leaves the apparatus.

One preferred embodiment of scrambler 16 is illustrated in FIG. 2. Referring to FIG. 2, it will be seen that scrambler apparatus 16 is comprised of memory buffer 120 and memory buffer 122, a control section 124, distributor 126, and switch 128.

Memory buffer 120 is preferably comprised of a memory array 134, latch 138 to receive data from distributor 126 via line 164, a latch 140 to receive data from switch 130 via line 166, a latch 142 to hold a data item to be output via line 168 and a switch 130 to control input to latch 140.

Memory buffer 122 is substantially identical in structure to buffer 120. It has memory array 136, and three latches 144, 146 and 148 which serve the same corresponding functions as the latches 138, 140 and 142. Furthermore, buffer 122 has an array of memory registers 136 which are identical in number and function to the array of memory registers 134 in buffer 120. Memory buffer 122 also contains switch 132 which corresponds to switch 130 in memory buffer 120.

The number of registers which comprise the array of memory registers in buffers 120 and 122 should be large enough to store the largest data stream anticipated by the user of this invention.

Referring again to FIG. 2, it will be seen that the control section 124 is preferably comprised of a mod N incrementor 152, an index scrambler 154, a master controller ("WHICH") 150, three latches 156, 160, 162 and a register 158.

The mod N incrementor 152 has a register 158 to hold as input a positive integer N fed through line 170. N is the number of items in the input data stream fed through line 12 in FIG. 1. The output of the mod N incrementor is latched into latch 156. The output of the index scrambler 154 in random access memory is latched into latch 160. The index input into index scrambler 154 is latched into latch 162.

The mod N incrementor 152 starts at 0, and each cycle increments its value as long as its value is less than $N-1$. When its value is $N-1$ it is reduced to 0 on the next cycle. Its output for each cycle is either the incremented value or 0, depending on whether or not $N-1$ was reached on the previous cycle.

The index scrambler 154 in random access memory takes input from the mod N incrementor 152 and generates and outputs the corresponding index of the scrambled array. For example, from the four point input data stream $y(0), y(1), y(2), y(3)$, the scrambled data stream $y(0), y(2), y(3), y(1)$ is desired. So the index scrambler 154 in random access memory takes as input the index 0 and outputs the index 0, on the next cycle takes as input the index 1 and outputs the index 2, on the next cycle takes 2 and outputs 3, and on the next cycle takes 3 and outputs 1.

The buffer controller 150 ("WHICH") operates in conjunction with the mod N incrementor 152, distributor 126 and switches 128, 130 and 132. Distributor 126 decides which of buffer 120 or buffer 122 receives the input. Switch 128 decides from which of buffer 120 and buffer 122 to take the output. Distributor 126 and switch 128 are not independent; in any given cycle, they make opposite decisions.

Switch 130 decides whether to use the mod N incrementor 152 or the index scrambler 154 in random access memory to index into buffer 120. Switch 132 decides whether to use the mod N incrementor 152 or the index scrambler 154 in random access memory to index into buffer 122. Switches 130 and 132 are not independent switches; in any given cycle, they make opposite decisions.

The master controller 150 ("WHICH") operates as described below. When controller 150 outputs 0, distributor 126 allows latch 138 to send a data item to buffer 134. Switch 128 allows latch 148 to send a data item to line 20. Switch 130 allows memory array 134 to receive its index into memory array 134 from the mod N incrementor 152. Switch 132 allows memory array 136 to receive its index into memory array 136 from the index scrambler 154 in random access memory.

When controller 150 outputs 1, the reverse of the above happens. Thus, distributor 126 allows latch 144 to send a data item to memory array 136. Switch 128 allows latch 142 to send a data item to line 20. Switch 130 allows memory array 134 to receive its index into memory array 134 from the index scrambler 154 in random access memory. Switch 132 allows memory array 136 to receive its index into memory array 136 from the mod N incrementor 152. When the mod N incrementor goes from $N-1$ to 0, the controller 150 inverts its value.

The output from scramblers 16 and 18 may be fed via lines 20 and 22, respectively, to format converters 24 and 26, respectively; these format converters may be similar in structure to format converters 102 and 104.

It will be appreciated by those skilled in the art that the use of format converters 24 and 26 is only required when the data from lines 20 and/or 22 is not in a form suitable for use by Discrete Fourier Transformer 31. In those instances when the data is in suitable form, a direct connection may be made to the Fourier Transformer 31. In such an instance, format converters 102 and 104 also will not be needed.

As will be appreciated by those skilled in the art, data format is the manner in which data (for example an integer or a real number) is represented as an ordered set of bits. For example, positive integers can be represented using the bits corresponding to the base 2 representation of the number; the number 9 can be represented by the 4 bits 1001. A real number, x times $2^y$ ( x is between 0 and 1, y is an integer) is often represented by: a single bit to hold the sign, a set of bits which are assigned to represent the exponent, y, and a set of bits which hold the value of x.

Each of the format converters 24 and 26 takes the data stream furnished to it (by either line 20 or 22) and changes it into a format suitable for use by the Discrete Fourier Transformer 31. Similarly, format converters 102 and 104 take the data streams furnished to them via lines 98 or 100 and convert them into a format suitable for use by either the unscramblers 110 or 112, or the format desired by the user of the device.

The output from format converters 24 and 26 is fed via lines 28 and 30 to Discrete Fourier Transformer 31. Any of the Discrete Fourier Transformers known to those skilled in the art may be used as Discrete Fourier Transformer 31. Thus, by way of illustration and not limitation, one may use the Discrete Fourier Transformers described in U.S. Pat. Nos. 4,972,358 of White, 4,972,358 of Welles et al., and 4,977,533 of Miyabayashi et al., the disclosures of each of which is hereby incorporated by reference into this specification.

The output from Discrete Fourier Transformer 31 is fed via lines 32 and 34 to Forward Folder 36. As is indicated in another section of this specification, in which applicants' algorithm is discussed, the forward folder provides data in the appropriate order to separator 46, which uses this rearranged data to implement formulas 51, 52, 53, and 54 discussed elsewhere.

The forward folder 36, together with the separator 46, implement formulas 51, 52, 53, and 54. This combination provides a means for translating the output of the Discrete Fourier Transformer 31 into two streams of data corresponding to the cosine transforms of the data input on lines 12 and 14.

Figure 3:
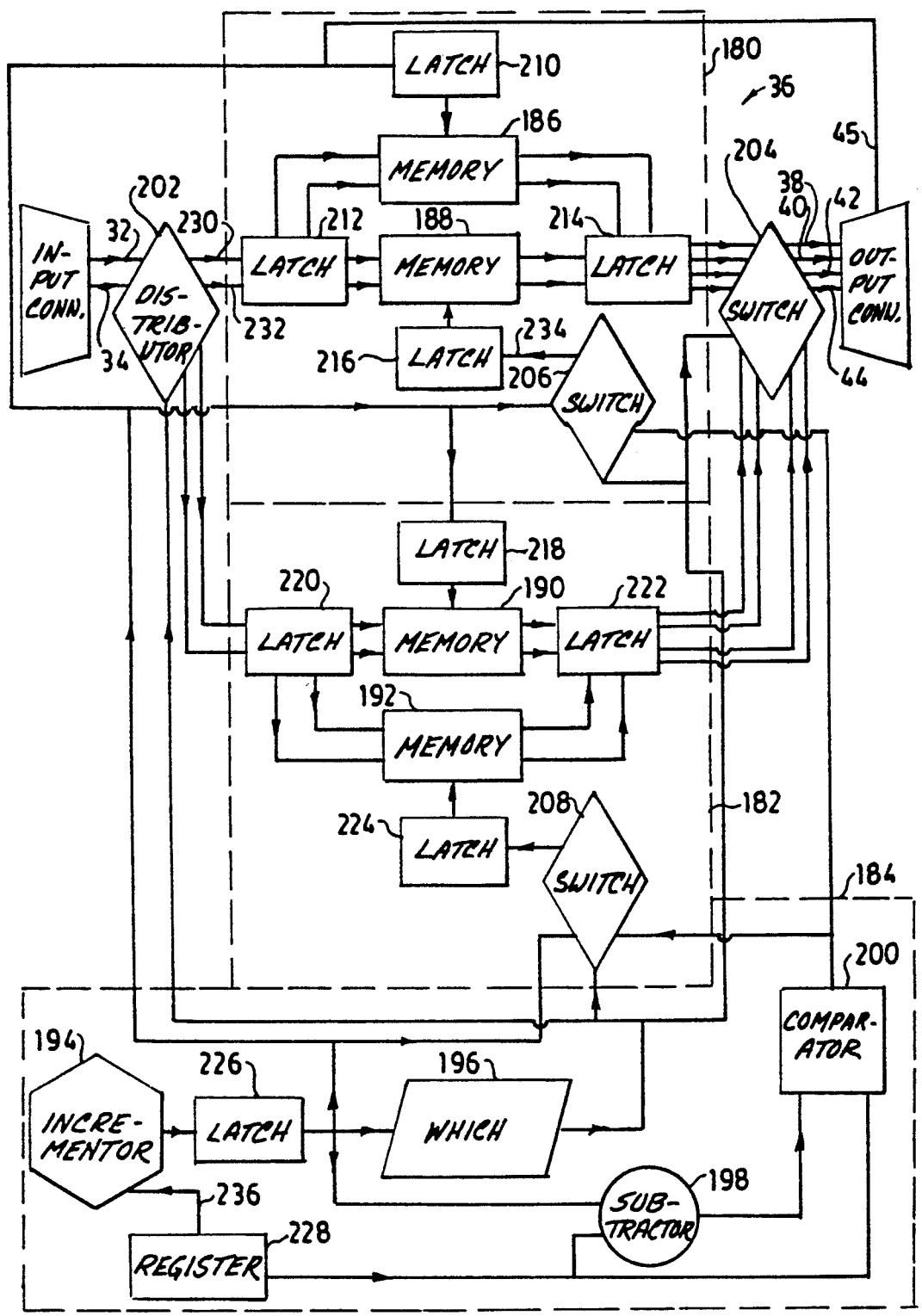
FIG. 3 is a block diagram illustrating one preferred embodiment of the forward folder 36 utilized in the apparatus of FIG. 1.

FIG. 3 illustrates one preferred embodiment of forward folder 36. Referring to FIG. 3, it will be seen that the function of forward folder 36 is to generate two copies of the output of the Discrete Fourier Transformer, one in the original order of the output of the Discrete Fourier Transformer, and one in modified reversed order.

Input line 32 holds the real output of the Discrete Fourier Transformer, and input line 34 holds the imaginary output of the Discrete Fourier Transformer. Every N cycles we store two copies of these N pairs of outputs from the Discrete Fourier Transformer in two separate memory buffers in the forward folder 36. Simultaneously, we output two copies of the N pairs of data items which were stored in the forward folder 36 in the previous N cycles. The first copy, output on lines 38 and 40 is in the original order of the output of the Discrete Fourier Transformer. The second copy, output on lines 42 and 44, is in a modified reversed order of the output of the Discrete Fourier Transformer. If the pairs were input in the order $p(0), p(1), \ldots, p(N-1)$, then they are output in the modified reversed order $p(0), p(N-1), p(N-2), \ldots, p(1)$.

Referring again to FIG. 1, it will be seen that the output from scrambler 16 is fed via line 20 to format converter 24 and, similarly, the output from scrambler 18 is fed via line 22 to format converter 26.

The forward folder 36 relies on double buffering to achieve input and output at the same rate, that is, for each cycle, two items of data enters the apparatus and four items leave the apparatus.

One preferred embodiment of forward folder 36 is illustrated in FIG. 3. Referring to FIG. 3, it will be seen that forward folder 36 consists of memory buffer 180 and memory buffer 182, a control section 184, distributor 202, and switch 204.

Memory buffer 180 is preferably comprised of two memory arrays 186 and 188, latch 212 to receive data from distributor 202 via line 230 and line 232, a latch 210 to receive an index directly from latch 226, a latch 216 to receive an index from switch 206 via line 234, a latch 214 to hold four data items to be output to switch 204 and a switch 206 to control input to latch 216.

Buffer 182 is substantially identical in structure to buffer 180. It has memory arrays 190 and 192, and four latches 218, 220, 222 and 224 which serve the same corresponding functions as the latches 210, 212, 214 and 216 of buffer 180. Furthermore, buffer 182 has two arrays of memory registers 190 and 192 which are identical in number and function to the two corresponding arrays of memory registers 186 and 188 in buffer 180. Memory buffer 182 also contains switch 208 which corresponds to switch 206 in memory buffer 180.

The number of registers which comprise the arrays of memory registers in buffers 180 and 182 should be large enough to store the largest data stream anticipated by the user of this invention.

Referring again to FIG. 3, it will be seen that the control section 184 is preferably comprised of a mod N incrementor 194, a subtractor 198, a comparator 200, a master controller ("WHICH") 196, a latch 226 and a register 228.

The mod N incrementor 194 has a register 228 to hold as input a positive integer N fed through line 236. N is the number of items in the input data stream fed through line 12 in FIG. 1. The output of the mod N incrementor is latched into latch 226.

The mod N incrementor 194 starts at 0, and each cycle increments its value as long as its value is less than $N-1$. When its value is $N-1$ it is reduced to 0 on the next cycle. Its output for each cycle is either the incremented value or 0, depending on whether or not $N-1$ was reached on the previous cycle.

The subtractor 198 subtracts the output of the mod N incrementor 194 which is latched in latch 226 from the contents of register 228, namely N. The comparator 200 compares the output of the subtractor 198 to the contents of register 228. When the output of the subtractor 198 is equal to the contents of register 228, the comparator 200 outputs 0. Otherwise the comparator 200 passes the output of the subtractor 198 through unchanged.

The buffer controller 196 ("WHICH") operates in conjunction with the mod N incrementor 194, distributor 202 and three switches 204, 206 and 208. Distributor 202 decides which of buffer 180 or buffer 182 receives the input. Switch 204 decides from which of buffer 180 and buffer 182 to take the output. Distributor 202 and switch 204 are not independent; in any given cycle, they make opposite decisions.

Switch 206 decides whether to use the mod N incrementor 194 or the comparator 200 to index into memory array 188. Switch 208 decides whether to use the mod N incrementor 194 or the comparator 200 to index into memory array 192. Switches 206 and 208 are not independent switches; in any given cycle, they make opposite decisions.

The master controller 196 ("WHICH") operates as described below. When controller 196 outputs 0, distributor 202 allows latch 212 to send two data items to memory array 186 and simultaneously to send the same two data items to memory array 188. Switch 204 allows latch 222 to send two data items from memory array 190 to lines 38 and 40 and simultaneously another two data items from memory array 192 to lines 42 and 44. Switch 206 allows memory array 188 to receive its index from the mod N incrementor 194. Switch 208 allows memory array 192 to receive its index from the comparator 200.

When controller 196 outputs 1, the reverse of the above happens. Thus, distributor 202 allows latch 220 to send two data items to memory array 190 and simultaneously to send the same two data items to memory array 192. Switch 204 allows latch 214 to send two data items from memory array 186 to lines 38 and 40 and simultaneously another two data items from memory array 188 to lines 42 and 44. Switch 208 allows memory array 192 to receive its index from the mod N incrementor 194. Switch 206 allows memory array 188 to receive its index from the comparator 200. When the mod N incrementor goes from $N-1$ to 0, the controller 150 inverts its value.

Figure 4:
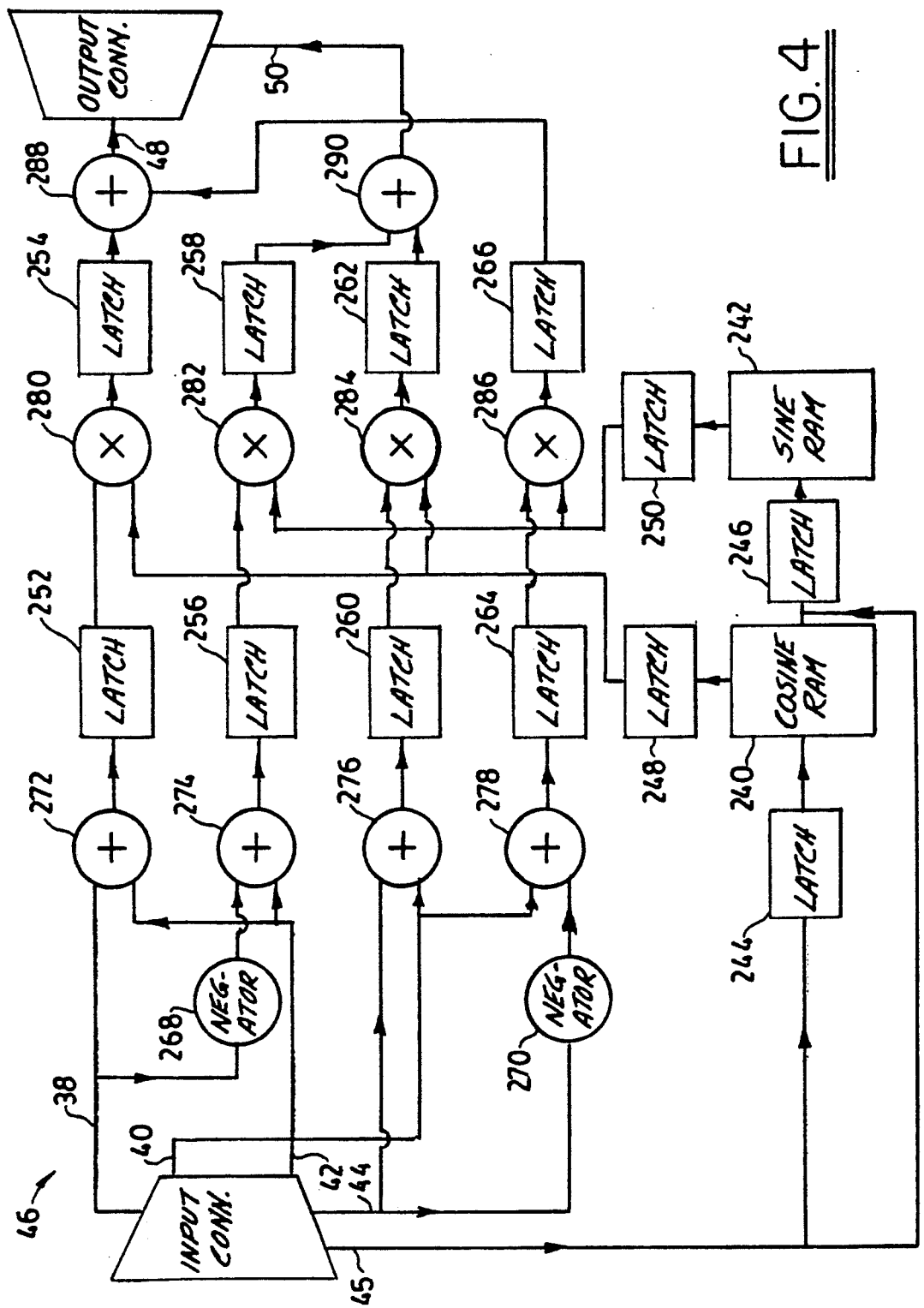
FIG. 4 is a block diagram illustrating one preferred embodiment of the separator 46 utilized in the apparatus of FIG. 1.

FIG. 4 illustrates one preferred embodiment of separator 46. The function of separator 46 is to accept the four streams of real numbers output by the forward folder 36 and output several cycles later two streams of real data; namely, the cosine transform of the two streams of data that were previously input on line 12 and line 14. More specifically, the cosine transform of the N point data stream input on line 12 is output on line

48. The cosine transform of the N point data stream input on line 14 is output on line 50.

One preferred embodiment of separator 46 is illustrated in FIG. 4. Referring to FIG. 4, it will be seen that the separator apparatus 46 consists of negator 268, negator 270, adder 272, adder 274, adder 276, adder 278, latch 252, latch 256, latch 260, latch 264, multiplier 280, multiplier 282, multiplier 284, multiplier 286, latch 254, latch 258, latch 262, latch 266, adder 288, adder 290, latch 244, latch 248, latch 246, latch 260, random access memory 240, and random access memory 242.

Negator 268 outputs the negation of the real number on line 38 to adder 274. Negator 270 outputs the negation of the real number on line 44 to adder 278. Adder 272 adds the real number on input line 38 to the real number on input line negation of the real number on input line 38 to the real number on line 42 and outputs the result to latch 256. Adder 276 adds the real number on input line 40 to the real number on input line 44 and outputs the result to latch 260. Adder 278 adds the negation of the real number on input line 44 to the real number on line 40 and outputs the result to latch 264.

Multiplier 280 multiplies the real number in latch 248 by the real number in latch 252 and outputs the result to latch 254. Multiplier 282 multiplies the real number in latch 250 by the real number in latch 256 and outputs the result to latch 258. Multiplier 284 multiplies the real number in latch 248 by the real number in latch 260 and outputs the result to latch 262. Multiplier 286 multiplies the real number in latch 250 by the real number in latch 264 and outputs the result to latch 266.

Adder 288 adds the real number in latch 254 to the real number in latch 266 and outputs its result on output line 48. Adder 290 adds the real number in latch 258 to the real number in latch 262 and outputs its result on output line 50.

Random access memories 240, and 242 are each large enough to hold N real numbers where N is the size of the input data stream on line 12 in FIG. 1. When k is loaded into latch 244 from line 45 random access memory 240 outputs cos (PI*k/ (2*N)) (where PI=3.141592...) to latch 248. Simultaneously k will be loaded into latch 246 from line 45 and random access memory 242 will output sin (PI*k/ 2N) to latch 250.

The output from separator 46 is fed via lines 48 and 50 to application hardware 51. As will be appreciated by those skilled in the art, any suitable application hardware which will utilize the cosine transformed data may be used as application hardware 51. Thus, by way of illustration and not limitation, the application hardware 51 may provide means for compressing a visual image, or filtering a visual image, for speech processing, or for evaluating economic trends, for studying climatological conditions, for doing many of the functions for which the Discrete Fourier Transform is used, for any other real data stream (such as that generated by an ultrasound device), and the like. Thus, for example, suitable uses for such data are described in U.S. Pat. Nos. 4,754,491 of Mischler, 4,675,836 of Arnould (which utilizes an discrete cosine transform calculation processor for compressing a television signal), 4,449,194 of Wilhelm, 4,196,448 of Whitehouse et al. (which discusses an image compression system), and 4,152,772 of Whitehouse. The disclosure of each of these patents is hereby incorporated by reference into this specification. It will be appreciated that the uses described in these patents is merely illustrative of the many uses to which the cosine transformed data may be put.

In general, the application hardware 51 will modify the cosine transformed data, thereby generating the cosine transform of the desired output. In such a case, there is a need to invert the cosine transform. It will be appreciated, however, that in some cases the output from hardware 51 will be suitable for immediate use.

The data from application hardware 51 is preferably fed via lines 52 and 54 to inverse folders 56 and 58. Inverse folders 56 and 58, in combination with trigonometric units 68 and 70, mixer 80, and sequencers 90 and 92, provide a function which is the inverse of the function provided by forward folder 36 and separator 46. The forward folder 36 and the separator 46 implement formulas 51, 52, 53, and 54 and provide in combination a means for translating the output of the Discrete Fourier Transformer 31 into two streams of data corresponding to the cosine transforms of the data input on lines 12 and 14. By comparison, the combination of inverse folders 56 and 58, trigonometric units 68 and 70, mixer 80, and sequencers 90 and 92 implement formulas 43, 45, and 56 through 64, which formulas are described elsewhere in this specification in a discussion of applicants' algorithm. Thus, the combination of such inverse folders, trigonometric units, mixer, and sequencers provides a means for taking cosine transformed data and changing it so that an inverse discrete Fourier Transformer will generate the inverse cosine transforms from data input on lines 52 and 54 in a scrambled order.

Figure 5:
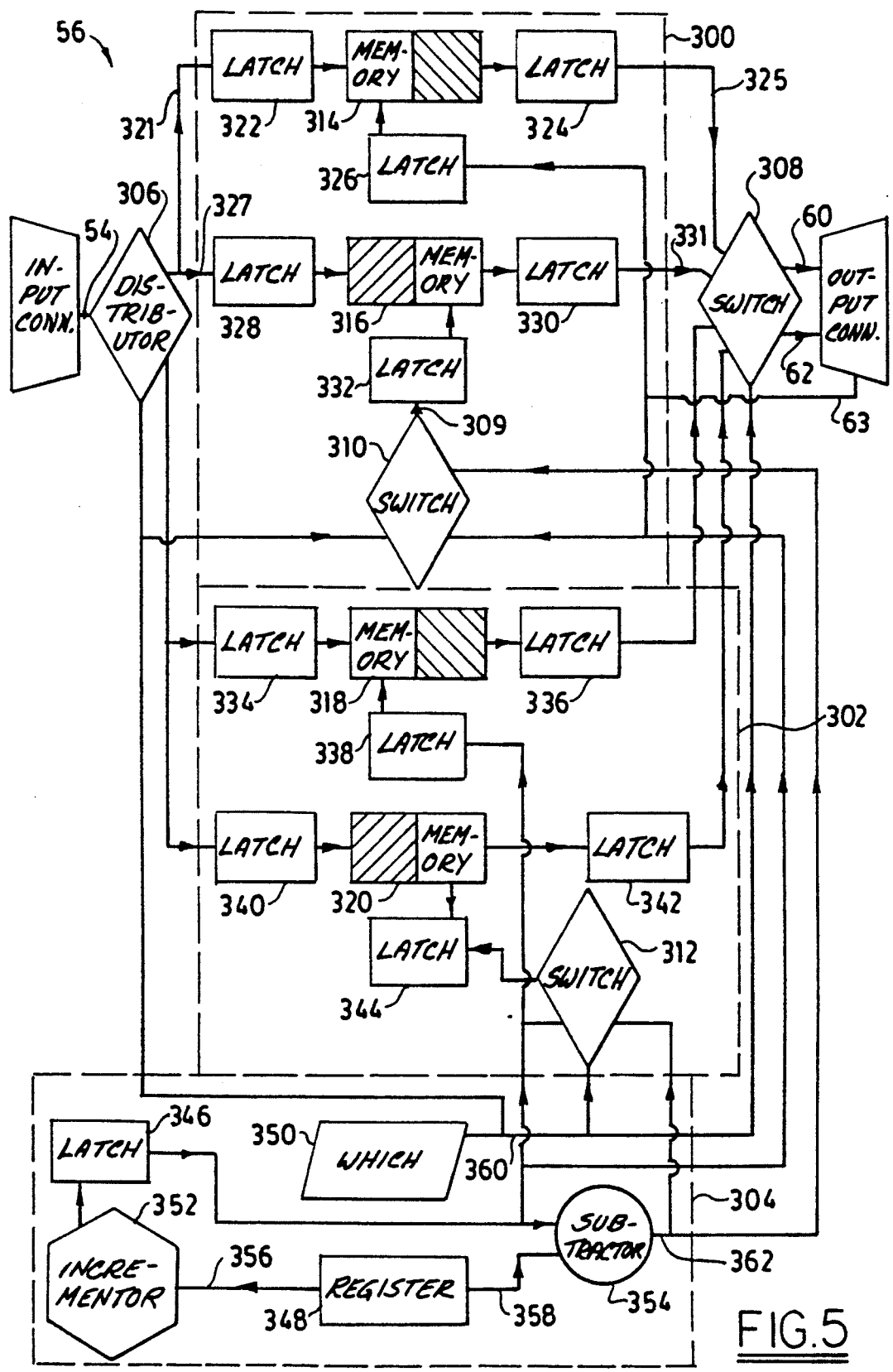
FIG. 5 is a block diagram illustrating one preferred embodiment of the inverse folders 56 and/or 58 utilized in the apparatus of FIG. 1.

FIG. 5 illustrates one preferred embodiment of inverse folder 56 and inverse folder 58. The function of inverse folder 56 is to generate two copies of the input data stream, one copy in the original order and second copy in a modified reversed order.

Every N cycles the inverse folder 56 stores N data items accepted from input line 54. Simultaneously, for the first (N/ 2)+1 of these N cycles, the inverse folder 56 generates two output streams on lines 60 and 62 containing the data items stored from the previous N cycles. Line 60 contains the first (N/ 2)+1 points of the previously stored N point data stream in its original order; line 62 contains the last N/ 2 points of the previously stored N point data stream but in modified reversed order. If the data items were input in the order x(0), x(1), x(2), . . . ,x(N−1) in the previous N cycles, then they are output in modified reversed order on line 62 as 0, x(N−1), x(N−2), . . . , x(N / 2) .

The inverse folder 56 relies on double buffering to achieve input and output at the same rate, that is, for each cycle, one item of data enters the apparatus and two items leave the apparatus.

Referring again to FIG. 5, it will be seen that inverse folder 56 consists of memory buffer 300 and memory buffer 302, a control section 304, distributor 306 and switch 308.

Memory buffer 300 is preferably comprised of two memory arrays 314 and 316, latches 322 and 328 to receive data from distributor 306 via line 321 and line 327, respectively, a latch 326 to receive an index directly from latch 346, a latch 332 to receive an index from switch 310 via line 309, latch 324 to hold data items to be output to switch 308 via line 325, and latch 330 to hold data items to be output to switch 308 via line 331, and a switch 310 to control input to latch 332.

Memory buffer 302 is substantially identical in structure to buffer 300. It has memory arrays 318 and 320, and six latches 334, 336, 338, 340, 342 and 344 which serve the same corresponding functions as the latches 322, 324, 326, 328, 330 and 332 of memory buffer 300.

Furthermore, buffer 302 has two arrays of memory registers 318 and 320 which are identical in number and function to the two corresponding arrays of memory registers 314 and 316 in memory buffer 300. Memory buffer 302 also contains switch 312 which corresponds to switch 310 in memory buffer 300.

The number of registers which comprise the arrays of memory registers in memory arrays 314 and 318 should be large enough to store (max / 2)+1 data items where max is the size of the largest data stream anticipated by the user of this invention. In a similar fashion, the number of registers which comprise the arrays of memory registers 316 and 320 should be large enough to store (max−[min/2])+1 data items where min is the size of the smallest data stream anticipated by the user of this invention. When N is stored or changed in register 348, memory arrays 314 and 318 must have all of their memory registers initialized to zero. Memory arrays 314 and 318 should contain registers with indices between min/2 and max inclusive.

Referring again to FIG. 5, it will be seen that the control section 304 is preferably comprised of a mod N incrementor 352, a subtractor 354, a master controller ("WHICH") 350, a latch 346 and a register 348.

The mod N incrementer 352 has a register 348 to hold as input a positive integer N fed through line 356. N is the number of items in the input data stream fed through line 12 in FIG. 1. The output of the mod N incrementer is latched into latch 346.

The mod N incrementor 352 starts at 0, and each cycle increments its value as long as its value is less than N−1. When its value is N−1 it is reduced to 0 on the next cycle. Its output for each cycle is either the incremented value or 0, depending on whether or not N−1 was reached on the previous cycle.

The subtractor 354 subtracts the output of the mod N incrementor 352 which is latched in latch 346 from the contents of register 348, namely N.

The buffer controller 350 ("WHICH") operates in conjunction with the mod N incrementer 352, distributor 306 and three switches 308, 310 and 312. Distributor 306 decides which of buffer 300 or buffer 302 receives the input. Switch 308 decides from which of buffer 300 and buffer 302 to take the output. Distributor 306 and switch 308 are not independent; in any given cycle, they make opposite decisions.

Switch 310 decides whether to use the mod N incrementor 352 or the subtractor 354 to index into memory array 316. Switch 312 decides whether to use the mod N incrementor 352 or the subtractor 354 to index into memory array 320. Switches 310 and 312 are not independent switches; in any given cycle, they make opposite decisions.

The master controller 350 ("WHICH") operates as described below. When controller 350 outputs 0, distributor 306 allows latch 322 to send a data item to memory array 314; simultaneously, distributor 306 also allows latch 328 to send a data item to memory array 316. Switch 308 allows latch 336 to send a data item to line 60; simultaneously, switch 308 allows latch 342 to send a data item to line 62. Switch 310 allows memory array 316 to receive its index from the mod N incrementer 352. Switch 312 allows memory array 320 to receive its index from the subtractor 354.

When controller 350 outputs 1, the reverse of the above happens. Distributor 306 allows latch 334 to send a data item to memory array 318; simultaneously, distributor 306 also allows latch 340 to send a data item to memory array 320. Switch 308 allows latch 324 to send a data item to line 60; simultaneously, switch 308 allows latch 330 to send a data item to line 62. Switch 312 allows memory array 320 to receive its index from the mod N incrementer 352. Switch 310 allows memory array 318 to receive its index from the subtractor 354. When the mod N incrementer goes from N−1 to 0, the controller 350 inverts its value.

Figure 6:
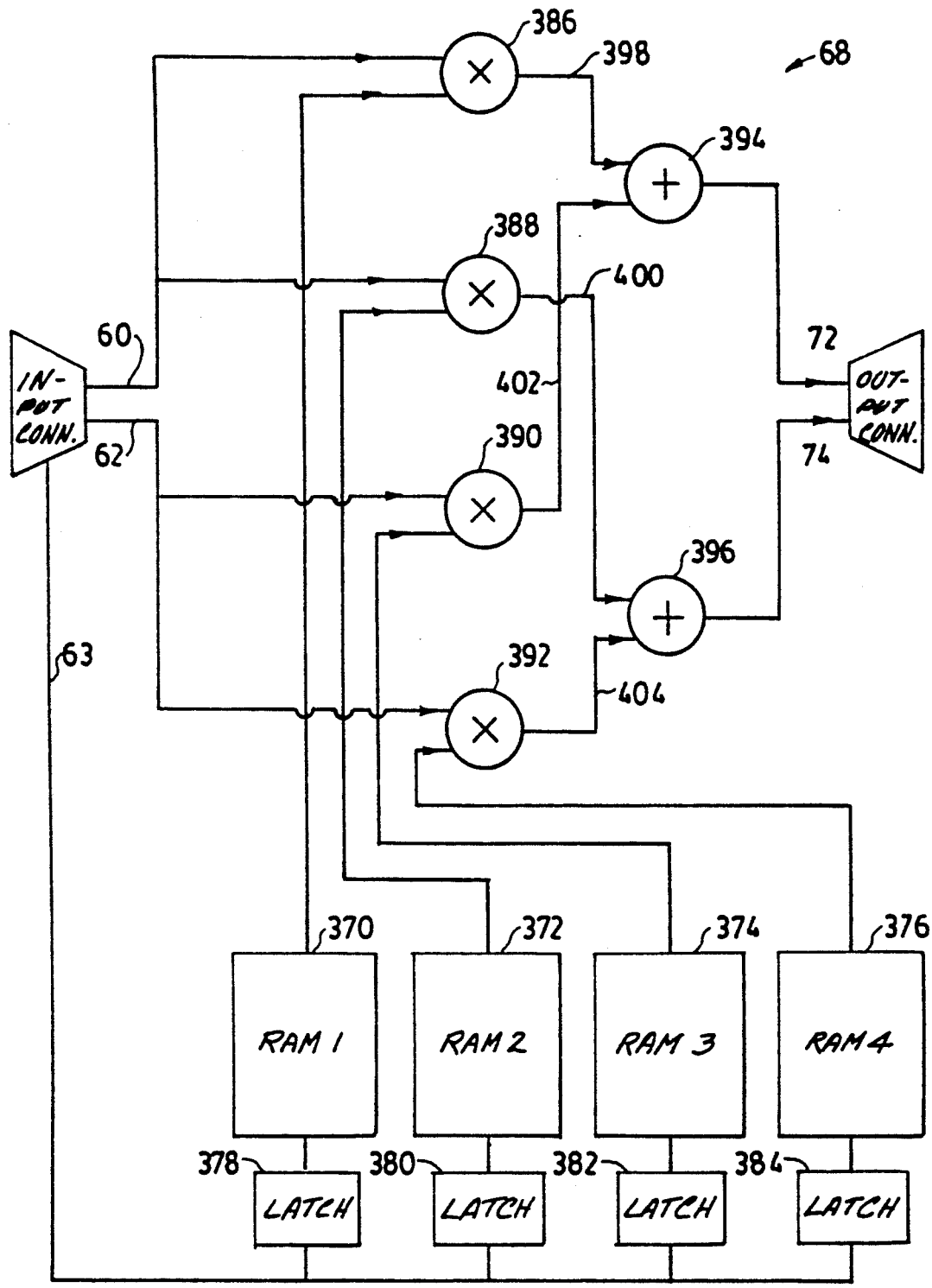
FIG. 6 is a block diagram illustrating one preferred embodiment of the trigonometric units 68 and/or 70 utilized in the apparatus of FIG. 1.

FIG. 6 illustrates one preferred embodiment of trigonometric unit 68 and trigonometric unit 70. The function of trigonometric unit 68 is to accept the two real data streams generated by the inverse folder and several cycles later generate two real output streams that contain the sum of products of trigonometric functions with the elements of the input data streams.

One preferred embodiment of trigonometric unit 68 is illustrated in FIG. 6. Referring to FIG. 6, it will be seen that the trigonometric unit 68 consists of multiplier 386, multiplier 388, multiplier 390, multiplier 392, adder 394, adder 396, random access memory 370, random access memory 372, random access memory 374, random access memory 376, latch 378, latch 380, latch 382 and latch 384.

Multiplier 386 multiplies the real number input on line 60 with the real number output by random access memory 370 and outputs the product on line 398. Multiplier 388 multiplies the real number input on line 60 with the real number output by random access memory 372 and outputs the product on line 400. Multiplier 390 multiplies the real number input on line 62 with the real number output by random access memory 374 and outputs the product on line 402. Multiplier 392 multiplies the real number input on line 62 with the real number output by random access memory 376 and outputs the product on line 404.

Adder 394 adds the real number output by multiplier 386 to the real number output by multiplier 390 and outputs the sum on line 72. Adder 396 adds the real number output by multiplier 388 to the real number output by multiplier 392 and outputs the sum on line 74.

Random access memories 370, 372, 374, and 376 are each large enough to hold (N/2)+1 real numbers where N is the size of the input data stream on line 12 in FIG. 1. When k is loaded into latch 378 from line 63 random access memory 370 outputs $\cos(PI*k/(2*N))/2$ (where $PI=3.141592...$) to multiplier 386. Simultaneously k will be loaded into latch 380 from line 63 and random access memory 372 will output $\sin(PI*k/2N)/2$ to multiplier 388. Simultaneously k will be loaded into latch 382 from line 63 and random access memory 374 will output $\cos(PI*k/2N)/2$ to multiplier 390. Simultaneously k will be loaded into latch 384 from line 63 and random access memory 376 will output $-\sin(PI*k/2N)/2$ to multiplier 392.

Figure 7:
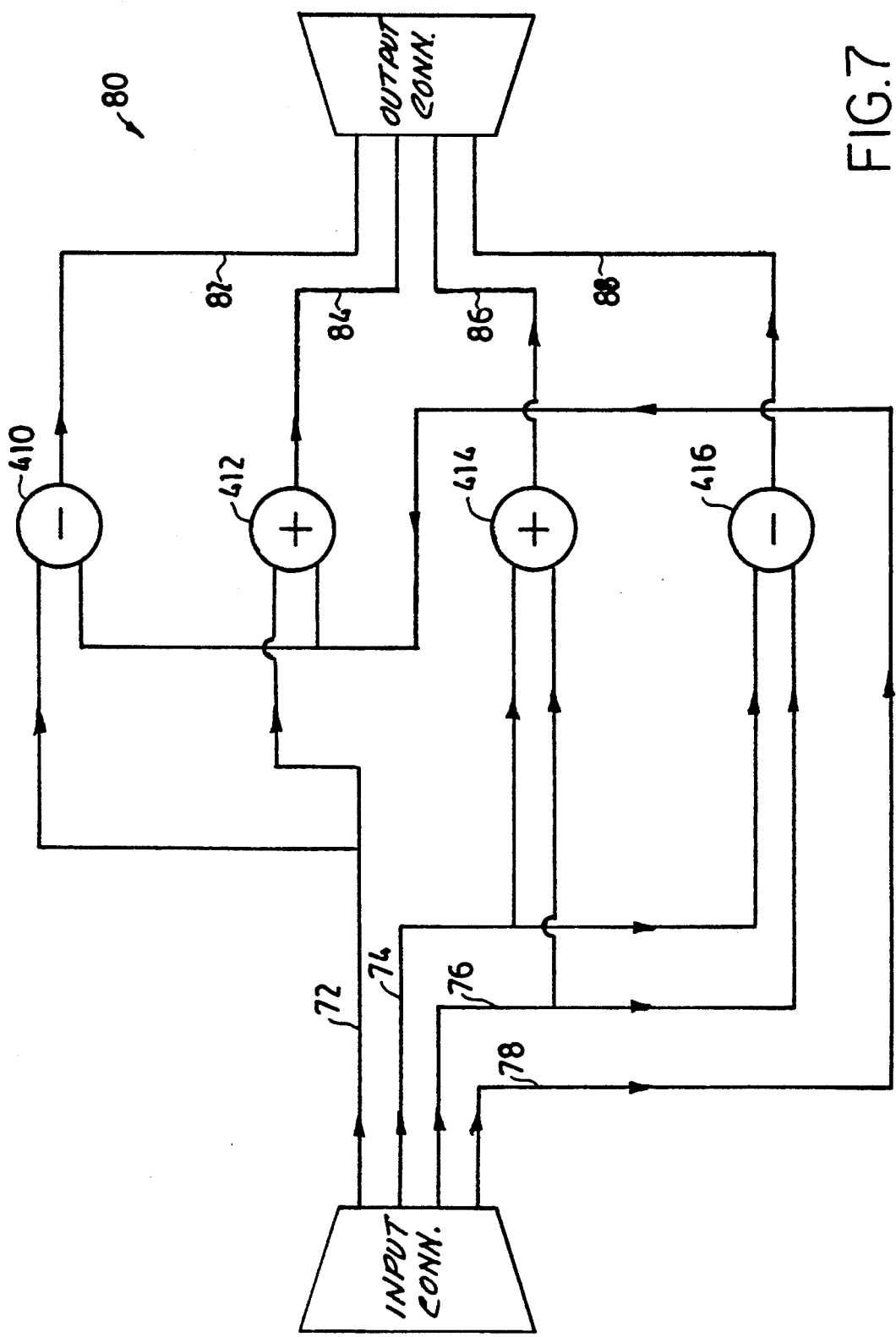
FIG. 7 is a block diagram illustrating one preferred embodiment of the mixer 80 utilized in the apparatus of FIG. 1.

FIG. 7 illustrates one preferred embodiment of mixer 80. The function of mixer 80 is to accept the 4 data streams generated by trignometric unit 68 and trignometric unit 70 and apply additions and subtractions to generate two pairs of output data streams. The first pair (on output lines 82 and 84) contains the data that when rearranged by sequencer 90 will be the real input to the Inverse Discrete Fourier Transformer. The second pair (on output lines 86 and 88) contains the data that when rearranged by sequencer 92 will be the imaginary input to the Inverse Discrete Fourier Transformer.

Referring again to FIG. 7, it will be seen that the mixer apparatus 80 consists of adder 412 and adder 414, differencer 410 and differencer 416.

Differencer 410 subtracts the real number input on line 78 from the real number input on line 72 and outputs the result on line 82. Adder 412 adds the real number input on line 72 to the real number input on line 78 and outputs the result on line 84. Adder 414 adds the real number input on line 76 to the real number input on line 74 and outputs the result on line 86. Differencer 416 subtracts the real number input on line 74 from the real number input on line 76 and outputs the result on line 88.

Figure 8:
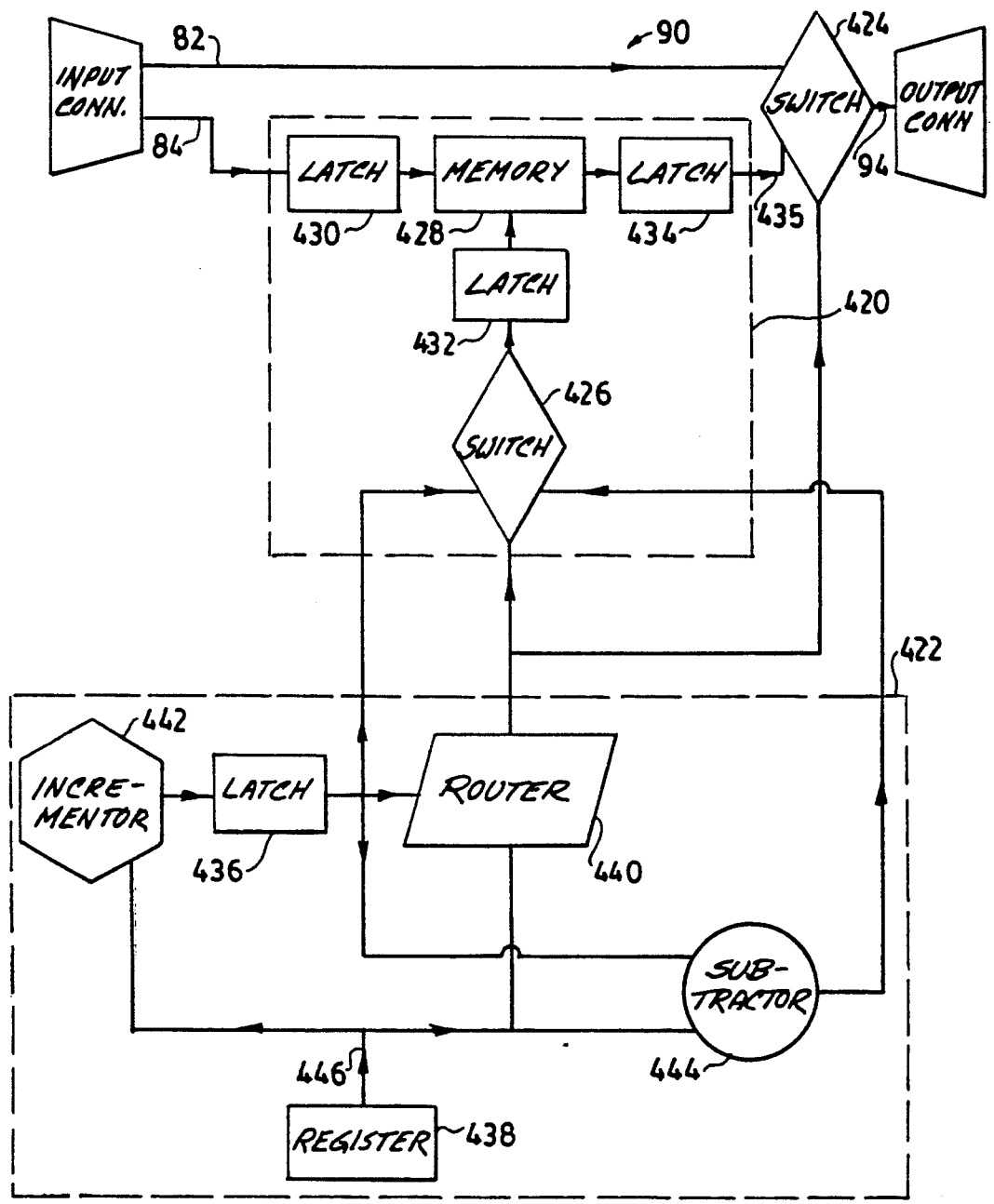
FIG. 8 is a block diagram illustrating one preferred embodiment of the sequencers 90 and/or 92 utilized in the apparatus of FIG. 1.

FIG. 8 illustrates one preferred embodiment of sequencer 90 and sequencer 92. Sequencer 90 accepts two real data streams on lines 82 and 84. In every set of N cycles, sequencer 90 only accepts input for the first (N /2)+1 cycles. In the first (N /2)+1 cycles, the real numbers input on line 82 are output unchanged on line 94 and the real numbers input on line 84 are stored in the memory buffer of sequencer 90. In the remaining (N /2)−1 cycles, the sequencer outputs the (N /2)−1 real numbers that were stored in the memory buffer of sequencer 90, but in reversed order.

Referring to FIG. 8, it will be seen that the sequencer apparatus 90 is comprised of memory buffer 420, control section 422 and switch 424.

Memory buffer 420 is preferrably comprised of a memory array 428, latch 430 to receive data on line 84, latch 432 to receive data from switch 426, latch 434 to hold data items to be output via line 435 to switch 424, and a switch 424 to control input to latch 432. The number of registers which comprise the array of memory registers in buffer 420 should be (max/2)+1 where max is the size of the largest data stream anticipated by the user of this invention.

The control section 422 is preferrably comprised of a mod N incrementor 442, a subtractor 444, a router 440, a latch 436 and a register 438 which holds a positive integer N, where N is the size of the input data stream on line 12 in FIG. 1.

The output of the mod N incrementor 442 is latched into latch 436. The mod N incrementor 442 starts at zero and each cycle increments its value as long as its value is less than N −1. When its value is N−1, its output is reduced to zero on the next cycle. Its output for each cycle is either the incremented value or zero depending on whether or not N−1 was reached on the previous cycle.

The subtractor 444 outputs the difference between the input to it from register 438 and the input to it from latch 436.

The router 440 operates in conjunction with mod N incrementor 442, register 438, switch 424 and switch 426. Switch 424 decides whether the output on line 94 will be taken directly from input line 82 or from memory buffer 420. Switch 426 decides whether to use the mod N incrementor 442 or the subtractor 444 t index into buffer 420.

When router 440 outputs zero, switch 424 sends the data item on line 82 to output line 94. Switch 426 causes the memory array 428 to accept the data item in latch 430 into the register indexed by the number in latch 436.

When router 440 outputs 1, switch 424 sends the data item in latch 434 to output line 94. Switch 426 causes memory array 428 to output to latch 434 the value in the memory array register indexed by the output of the subtractor 444; memory array 428 does not read any value from latch 430 in this case.

When the mod N incrementor 442 outputs zero, router 440 outputs zero. Router 440 continues to output zero until mod N incrementor 442 outputs (N/2)+1. When mod N incrementor 442 outputs (N/2)+1, then on the next cycle, router 440 outputs 1.

Referring again to FIG. 1, data from sequencers 90 and 92 are fed via lines 94 and 96, respectively, to Inverse Discrete Fourier Transformer 97. Any of the Inverse Discrete Fourier Transformers known to those skilled in the art may be used in applicants' device. Thus, by way of illustration and not limitation, one may use the Discrete Fourier Transformers and/or the Inverse Discrete Fourier Transformers described in U.S. Pat. No. 4,531,197, 4,051,357, 5,018,091, 4,992,967, 4,970,674, 4,965,761, and the like. The disclosure of each of these U.S. patents is hereby incorporated by reference into this specification.

The data from Inverse Discrete Fourier Transformer 97 is fed via lines 98 and 100 to format converters 102 and 104, which are similar in structure to format converters 24 and 26. However, the function of format converters 102 and 104 is the inverse of the function of format converters 24 and 26. Format converters 102 and 104 convert the data from the Inverse Discrete Fourier Transformer 97 into the same data format as the data which enters the apparatus on lines 12 and 14.

As is known to those skilled in the art, the term data format refers to the way data (such as a real number) or a real number is represented as an ordered set of bits. A real number, x times $2^y$ (where x is between 0 and 1, y is an integer) is often represented by: a single bit to hold the sign, a set of bits which are assigned to represent the exponent, y, and a set of bits which hold the value of x.

The term "formatted data," as used in this specification, refers to data which is in the format that the components of the apparatus 10 (such as the Discrete Fourier Transformer or the Adder) expects.

The Inverse Discrete Fourier Transformer outputs two streams of real inverse cosine transformed data in a scrambled order. Unscrambler 110 and unscrambler 112 accept such a scrambled stream $x(1), x(2), \ldots x(N)$ and simultaneously output a previously scrambled stream $y(1), y(2), \ldots y(N)$ in the correct order.

One preferred embodiment of unscrambler 110 and unscrambler 112 has a similar design to that of scrambler 16. In this embodiment, the only difference between scrambler 16 and unscrambler 110 and/or unscrambler 112 is in the indices stored in "scrambler RAM" 154 (see FIG. 2).

The input to the unscrambler 110 on line 102 will be scrambled as shown in (A), supra. Thus when latch 162 in FIG. 2 is loaded with a k which is even, scrambler ram 154 will output k/2 to latch 160. When latch 162 in FIG. 2 is loaded with a k which is odd, scrambler ram 154 will output (k+N−1)/2 to latch 160 where N is the size of the input data stream on line 12 in FIG. 1.

In the next section of this specification, applicants will discuss the preferred algorithm which may be used in the device 10 described above.

BACKGROUND AND DEVELOPMENT OF THE METHOD USED IN THE INVENTION

A. The Discrete Fourier Transform Pair.

An N point Discrete Fourier Transform pair (where N is a positive integer) is given by $$X(k) = \sum_{n=0}^{N-1} x(n) W_N^{nk}, \quad 0 \leq k \leq N-1 \tag{1}$$

-continued
$$x(n) = \frac{1}{N} \sum_{k=0}^{N-1} X(k) W_N^{-kn}, 0 \leq n \leq N - 1 \quad (2)$$

$$W_N = e^{\frac{-2\pi}{N}j} = \cos\left(\frac{2\pi}{N}\right) - j\sin\left(\frac{2\pi}{N}\right), j = \sqrt{-1}$$

Formulas (1) and (2) operate as a pair. Formula (1) is called an N point Forward Discrete Fourier Transform and formula (2) is the corresponding N point Inverse Discrete Fourier Transform.

Formulas (1) and (2) are interpreted in the following way. Start with an N point data stream $x(0), x(1), x(2), \ldots, x(N-1)$ and regard this N point data stream as part of (or embedded in) a larger data stream, namely $$\ldots x(N-1), x(0), x(1), x(2) \ldots x(N-1), x(0) \ldots \quad (3)$$

The larger data stream (really infinite in number) is arrived at by extending the original N point data stream periodically in both directions with period N, so that $x(N)=x(0)$, $x(N+1)=x(1)$, $x(N+2)=x(2)$, ... $x(-1)=x(N-1)$, $x(-2)=x(N-2)$, $x(-3)=x(N-3)$, ... The N point sequence $X(0), X(1), X(2), \ldots, X(N-1)$ has the same interpretation. The justification for both interpretations is that $$W_N^{nk} = e^{\frac{-2\pi nk}{N}j} = \cos\left(\frac{2\pi nk}{N}\right) - j\sin\left(\frac{2\pi nk}{N}\right)$$

$$W_N^{-kn} = e^{\frac{2\pi kn}{N}j} = \cos\left(\frac{2\pi kn}{N}\right) + j\sin\left(\frac{2\pi kn}{N}\right)$$

In other words, $$W_N^{nk}, W_N^{-kn}$$

are linear combinations of cosines and sines. Each of these cosines and sines has the property that its value at $p+N$ (similarly at $p-N$) is the same as its value at p. Consequently the X(k)'s as given by formula (1) and the x(n)'s as given by formula (2) inherit this property.

In a standard application of the Discrete Fourier Transform Pair (1) and (2), an N point data stream is forward transformed by means of formula (1) to produce an N point sequence of complex numbers $X(0), X(1), X(2), \ldots, X(N-1)$. This newly generated N point sequence is then altered in some manner (filtered). The filtered sequence is then inverse transformed by means of formula (2). The result is an improved data sequence.

Typically this round robin process is applied to a data stream consisting of many N point data substreams.

B. The Discrete Cosine Transform Pair.

An N point Discrete cosine Transform pair (where N is a positive integer) is given by $$C(k) = \sum_{n=0}^{N-1} 2x(n)\cos\frac{\pi}{2N}(2n+1)k, 0 \leq k \leq N-1 \quad (4)$$

$$x(n) = \frac{C(0)}{2N} + \frac{1}{N} \sum_{k=1}^{N-1} C(k)\cos\frac{\pi}{2N} k(2n+1), \quad (5)$$

$$0 \leq n \leq N - 1$$

Formulas (4) and (5) operate as a pair, as do formulas (1) and (2). Formula (4) is called an N point Forward Discrete Cosine Transform and formula (5) is the corresponding N point Inverse Discrete Cosine Transform.

Formulas (4) and (5) are intimately linked to a 2N point Forward Discrete Fourier Transform (formula (1) with N replaced by 2N) and a 2N point Inverse Discrete Fourier Transform (formula (2) with N replaced by 2N) respectively. A sketch of this assertion for formula (4) follows.

Let $x(0), x(1), x(2), \ldots, x(N-1)$ be an N point data stream. Append to this N point data stream its reflection about $N-\frac{1}{2}$, thereby creating the following 2N point data stream:

$$x(0), x(1) \ldots x(N-1), x(N-1) \ldots x(1), x(0) \quad (6)$$

which we may regard as embedded in a larger data stream, namely $$\ldots x(0, x(0) \ldots x(N-1), x(N-1) \ldots x(0), x(0) \ldots \quad (7)$$

The larger data stream is arrived at by the same process as in formula (3), which in the present case amounts to extending the 2N point data stream as given in formula (6) periodically in both directions with period 2N. Taking the Forward Discrete Fourier Transform of the 2N point data stream of formula (6), and denoting the transformed sequence by Y(k) for k from 0 to 2N−1 inclusive, we obtain $$Y(k) = \sum_{n=0}^{N-1} x(n) W_{2N}^{nk} + \sum_{n=N}^{2N-1} x(2N - 1 - n) W_{2N}^{nk}, \quad (8)$$

$$0 \leq k \leq 2N - 1$$

By algebraic manipulation, formula (8) becomes $$Y(k) = W_{2N}^{-\frac{k}{2}} \sum_{n=0}^{N-1} 2x(n)\cos\frac{\pi}{2N}(2n+1)k, 0 \leq k \leq 2N - 1 \quad (9)$$

If we define C'(k) by $$C'(k) = Y(k) W_{2N}^{\frac{k}{2}} \quad (10)$$

$$= \sum_{n=0}^{N-1} 2x(n)\cos\frac{\pi}{2N}(2n+1)k, 0 \leq k \leq 2N - 1$$

then c'(k) has the property that when the data stream $x(0), x(1), x(2), \ldots, x(N-1)$ consists of N real items, then all of the C'(k)'s are real ($0 \leq k \leq 2N-1$). Furthermore, by algebraic manipulation, it follows from formula (10) that $$C'(2N-k) = -C'(k), N \leq k \leq 2N-1 \quad (11)$$

In other words, formula (11) indicates that N of the C'(k)'s are redundant. In particular, by substituting k=N into formula (11), C'(N)=−C'(N), so C'(N)=0. Also C'(N+1)=−C'(N−2)...C'(2N−1)=−C'(1) So even though the C'(k)'s were generated by a 2N point Forward Discrete Fourier Transform, only the first N of the c'(k)'s are independent. We rename these first N C'(k)'s as $$C(k) = C'(k), \ 0 \leq k \leq N-1 \quad (12)$$

Formula (12) combined with formula (10) gives formula (4).

We observe that by symmetrically extending the input sequence $x(0), x(1), x(2), \ldots, x(N-1)$ as is done in formula (6), the Nth term, whose value is $x(N-1)$ (see formula (6)) is automatically equal to the $(N+1)$st term, whose value is also $x(N-1)$. More generally, as expressed in formula (7), the $-1$st term, whose value is $x(0)$ (see formula (7)) is automatically equal to the 0th term, whose value is also $x(0)$. This is in sharp contrast to the input sequence of the Forward Discrete Fourier Transform as expressed in formula (3).

In formula (3) we see that the value of the Nth term is $x(N-1)$ and the value of the $(N+1)$st term is $x(0)$; if $x(N-1)$ does not equal $x(0)$, an artificial discontinuity is created. We further see in formula (3) that the value of the $-1$st term is $x(N-1)$ and the value of the 0th term is $x(0)$; again, if $x(N-1)$ does not equal $x(0)$, we have another artificial discontinuity.

If an N point sequence is forward transformed with the Forward Discrete Fourier Transform, then filtered, and then inverse transformed with the Inverse Discrete Fourier Transform, such artificial discontinuities in the input sequence can adversely affect the quality of the output sequence. In particular, the starting items of the input sequence can have an effect on the ending items of the output sequence (likewise, the ending items of the input sequence can have an effect on the starting items of the output sequence). This situation can not happen with the Discrete Cosine Transform because of the reconstruction of its input sequence with a double length symmetric sequence (see formula (6) and more generally formula (7)).

Formula (5), which expresses the N point Inverse Discrete Cosine Transform can be arrived at by back-tracking on the steps which led up to formula (4) and appropriately undoing each step. A brief sketch of this assertion follows.

We start with an N point sequence $C(0), C(1), C(2), \ldots, C(N-1)$. From these N $C(k)$'s and formulas (12) and (11), we construct a 2N point sequence $C'(0), C'(1), C'(2), \ldots, C'(2N-1)$. From the equation on the left hand side of formula (10), we have $$Y(k) = C'(k) W_{2N}^{-\frac{k}{2}}, \ 0 \leq k \leq 2N-1 \quad (13)$$

that is, we have recovered $Y(0), Y(1), Y(2), \ldots, Y(2N-1)$. We apply a 2N point Inverse Discrete Fourier Transform to these 2N $Y(k)$'s (formula (2) with N replaced by 2N). This recovers the 2N point sequence (6), from which we extract the first N data items.

C. Evaluating an N point Discrete Cosine Transform Pair of a real data stream by means of an N point Discrete Fourier Transform Pair.

From this point on in the development of the method used in the invention, we specifically state that the N point data stream $x(0), x(1), x(2), \ldots, x(N-1)$ consists entirely of real (as opposed to complex) numbers. In the preceding section B, we developed the N point Forward Discrete Cosine Transform (formula (4)) by means of a 2N point Forward Discrete Fourier Transform (formula (1)) with N replaced by 2N. In section B, we also briefly sketched the development of the N point Inverse Discrete Cosine Transform (formula (5)) by means of a 2N point Inverse Discrete Fourier Transform (formula (2) with N replaced by 2N). However, when the N point data stream consists entirely of real numbers, it is possible to evaluate an N point Forward Discrete Cosine Transform by means of an N point Forward Discrete Fourier Transform (as opposed to a 2N point Forward Discrete Fourier Transform). similarly, when the N point data stream is real, it is possible to evaluate an N point Inverse Discrete Cosine Transform by means of an N point Inverse Discrete Fourier Transform (as opposed to a 2N point Inverse Discrete Fourier Transform). See Narasimha and Peterson[1] and Makhoul[2]. Using an N point Discrete Fourier Transform Pair instead of a 2N point Discrete Fourier Transform Pair to evaluate an N point Discrete Cosine Transform Pair results in a speed up in processing time by a factor of approximately 2. We present here a sketch of the development of such an evaluation in the forward direction followed by a sketch of same in the inverse direction.

The key to the improvement in the evaluation of an N point Discrete Cosine Transform Pair (as discussed in the preceding paragraph) is that we can take advantage of the symmetry present in the 2N point data stream given in formula (6).

a. The forward direction.

We start with $$\begin{array}{l} \text{— initial } N \text{ point data stream—} \\ x(0), x(1), x(2) \ldots x(N-1) \end{array} \quad (14)$$

and then append to the initial N point data stream given in formula (14) its reflection about $N-\frac{1}{2}$, and obtain $$\begin{array}{l} \text{— } 2N \text{ point input data stream —} \\ x(0), x(1) \ldots x(N-1), x(N-1) \ldots x(1), x(0) \end{array} \quad (15)$$

For convenience, we rename the 2N point input data stream given in formula (15) as follows:

$$\begin{array}{l} \text{— } 2N \text{ point input data stream —} \\ y(0), y(1) \ldots y(N-1), y(N-1) \ldots y(1), y(0) \end{array} \quad (16)$$

where the explicit correspondence between the $x(n)$'s of formula (15) and the $y(n)$'s of formula (16) is given by $$y(n) = \begin{cases} x(n), \ 0 \leq n \leq N \\ x(2N-1-n), \ N \leq n \leq 2N-1 \end{cases} \quad (17)$$

We now sample the $y(n)$'s of formula (16) which have even indices, thereby obtaining $$\begin{array}{l} \text{— } N \text{ point sampled data stream —} \\ y(0), y(2), y(4) \ldots y(2N-3), y(2N-1) \end{array} \quad (18)$$

which we rename $$\begin{array}{l} N \text{ point sampled data stream} \\ s(0), s(1), s(2) \ldots s(N-1) \end{array} \quad (19)$$

where the $s(n)$'s are related to the $y(n)$'s by $$s(n) = y(2n), \ 0 \leq n \leq N-1 \quad (20)$$

The $s(n)$'s as expressed in formulas (19) and (20) are simply a permutation of the N data items in the initial N point data stream of formula (14). For example, if the initial data stream in formula (14) consists of 5 data items x(0), x(1), x(2), x(3), x(4), then the s(n)'s of formulas (19) and (20) consist of x(0), x(2), x(4), x(3),x(1).

It is to the N point sampled data stream of formulas (19) and (20) that we apply an N point Forward Discrete Fourier Transform. For the remainder of this section, and throughout the disclosure of the invention, we refer to the N point data stream of formulas (19) and (20) as the N point scrambled data stream $$N \text{ point scrambled data stream} \quad (21)$$
$$s(0), s(1), s(2) \ldots s(N-1)$$

If we sample the y(n)'s of formula (16) which have odd indices, we still obtain the N point scrambled data stream of formula (21), but in reversed order. The explicit expression of this statement is $$y(2n+1)=s(N-1-n), 0 \leq n \leq N-1 \quad (22)$$

For example, if the initial data stream in formula (14) consists of 4 data items x(0), x(1), x(2), x(3), then the y(n)'s of formulas (16) and (17) consist of the 8 data items x(0), x(1), x(2), x(3), x(3), x(2), x(1), x(0). The even indexed samples of this 8 point data stream are x(0), x(2), x(3), x(1) and the odd indexed samples are x(1, x(3), x(2), x(0). In other words, we still obtain the scrambled data stream of formula (21) (namely x(0), x(2), x(3), x(1)) but in reversed order (namely x(1), x(3), x(2), x(0)).

Applying the Forward Discrete Fourier Transform to the 2N point input data stream of formula (16), we obtain (for $0 \leq k \leq 2N-1$)

$$Y(k) = \sum_{n=0}^{2N-1} y(n) W_{2N}^{nk} \quad (23)$$
$$= \sum_{n=0}^{N-1} y(2n) W_{2N}^{2nk} + \sum_{n=0}^{N-1} y(2n+1) W_{2N}^{(2n+1)k}$$
$$= \sum_{n=0}^{N-1} s(n) W_N^{nk} + W_{2N}^{k} \sum_{n=0}^{N-1} s(N-1-n) W_N^{nk}$$

In formula (23), we first expressed the summation from 0 to 2N−1 as two summations, one summation over the even integers from 0 to 2N−1, and the other summation over the odd integers from 0 to 2N−1; then we applied formulas (20) and (22).

Letting p=N−1−n, the last summation in formula (23) becomes (for $0 \leq k \leq 2N-1$)

$$\sum_{n=0}^{N-1} s(N-1) W_N^{nk} = \sum_{p=N-1}^{0} s(p) W_N^{(N-1-p)k} \quad (24)$$
$$= W_N^{-k} \sum_{n=0}^{N-1} s(n) W_N^{-nk}$$

From formulas (23) and (24), we obtain $$Y(k) = \sum_{n=0}^{N-1} s(n) W_N^{nk} + W_{2N}^{-k} \sum_{n=0}^{N-1} s(n) W_N^{-nk}, \quad (25)$$
$$0 \leq k \leq 2N-1$$

Let S(k), $0 \leq k \leq N-1$ denote the Forward Discrete Fourier Transform of the s(n)'s, i.e.

$$S(k) = \sum_{n=0}^{N-1} s(n) W_N^{nk}, \quad (26)$$
$$0 \leq k \leq N-1$$

Since the s(n)'s are real, we have from formulas (25) and (26) that $$Y(k)=S(k)+\overline{S(k)}W_{2N}^{-k}, 0 \leq k \leq N-1 \quad (27)$$

where the bar over S(k) in formula (27) indicates complex conjugation. Formula (27) combined with formula (12) and the first equation in formula (10) yields (for $0 \leq k \leq N-1$)

$$C(k) = Y(k)W_{2N}^{\frac{k}{2}}$$
$$= S(k)W_{2N}^{\frac{k}{2}} + \overline{S(k)}W_{2N}^{-\frac{k}{2}}$$
$$= S(k)W_{2N}^{\frac{k}{2}} + \overline{S(k)W_{2N}^{\frac{k}{2}}}$$

i.e.

$$C(k) = 2Re(S(k)W_{2N}^{\frac{k}{2}}),$$
$$0 \leq k \leq N-1$$

where Re( ) denotes the operation of taking the real part of a complex number. Formula (28) expresses the evaluation of the Forward Discrete Cosine Transform of an N point real data stream (the initial N point data stream of formula (14)) in terms of the Forward Discrete Fourier Transform of the N point scrambled data stream of formulas (21), (20) and (17).

b. The inverse transform.

We evaluate the N point Inverse Discrete Cosine Transform by backtracking on the steps which led up to formula (28) and appropriately undoing each step. We start with an N point sequence C(0), C(1), C(2), ..., C(N−1). From these N C(k)'s and formula (12) and the first equation in formula (10), we have $$Y(k) = C(k)W_{2N}^{-\frac{k}{2}}, \quad (29)$$
$$0 \leq k \leq N-1$$

that is, we have recovered Y(0), Y(1), Y(2), ..., Y(N−1). Replacing k with N−k in formula (27) and restricting the index k to a range from 1 to N−1 inclusive, we obtain $$Y(N-k)=S(N-k)+\overline{S(N-k)}W_{2N}^{-(N-k)}, 1 \leq k \leq N-1 \quad (30)$$

Using the fact that a Forward Discrete Fourier Transform of a real N point data stream satisfies the redundancy relations $$X(N-k)=\overline{X(k)} \text{ (all integers k)} \quad (31)$$

it follows by taking the complex conjugate of both sides of the equation in formula (30) that $$Y(N-k)=S(k)-S(k)W_{2N}^{-k}, 1\leq k\leq N-1 \qquad (32)$$

It follows from formulas (32) and (27) that $$S(k)=\tfrac{1}{2}[Y(k)+Y(N-k)], 1\leq k\leq N-1 \qquad (33)$$

From formula (27)

$$\begin{aligned} Y(0) &= S(0) + S(0) \\ &= 2S(0), \\ S(0) &= \tfrac{1}{2}Y(0) \end{aligned} \qquad (34)$$

Combining formulas (33) and (34), $$S(k) = \begin{cases} \tfrac{1}{2}[Y(k) + Y(N-k)], & 1 \leq k \leq N-1 \\ \tfrac{1}{2}Y(0), & k=0 \end{cases} \qquad (35)$$

Formula (35) expresses that we have recovered s(0), s(1), s(2), ..., S(N−1). We apply an N point Inverse Discrete Fourier Transform to these N S(k)'s. This recovers the N point sequence s(0), s(1), s(2), ..., s(N−1) given by formulas (21) and (20). We unscramble these N s(n)'s by applying $$x(n) = \begin{cases} s\left(\dfrac{n}{2}\right), & n \text{ even}, 0 \leq n \leq N-1 \\ s\left(\dfrac{2N-1-n}{2}\right), & n \text{ odd}, 0 \leq n \leq N-1 \end{cases} \qquad (36)$$

This recovers the initial N point data stream as expressed in formula (14).

D. Evaluating two N point Discrete Fourier Transforms simultaneously when the data streams are real.

Let r(n), $0\leq n\leq N-1$ denote a real N point data stream and let R(k), $0\leq k\leq N-1$ denote its N point Forward Discrete Fourier Transform. Similarly, let i(n), $0\leq n\leq N-1$ denote a real N point data stream and let I(k), $0\leq k\leq N-1$ denote its N point Forward Discrete Fourier Transform.

a. The forward direction.

Form the complex N point data stream z(n)=r(n)+ji(n), $0\leq n\leq N-1$ and let Z(k), $0\leq k\leq N-1$ denote its N point Forward Discrete Fourier Transform. Since the Discrete Fourier Transform is a linear transform, we have $$Z(k)=R(k)+jI(k), 0\leq k\leq N-1 \qquad (37)$$

The R(k)'s and I(k)'s are complex numbers, and they are intermixed in the equation of formula (37) to form the Z(k)'s. We must solve explicitly for the R(k)'s and the I(k)'s in terms of the Z(k)'s.

Replacing k with N−k in formula (37) and restricting the index k to a range from 1 to N−1 inclusive, we obtain $$Z(N-k)=R(N-k)-jI(N-k), 1\leq k\leq N-1 \qquad (38)$$

The redundancy relations of formula (31) hold for the N point Forward Discrete Fourier Transform of a real data stream. It follows from formula (31) and formula (38) that $$Z(N-k)=R(k)-jI(k), 1\leq k\leq N-1 \qquad (39)$$

From formulas (39) and (37), we have $$\begin{cases} R(k) = \dfrac{1}{2}[Z(k) + Z(N-k)], & 1 \leq k \leq N-1 \\ I(k) = \dfrac{1}{2j}[Z(k) - Z(N-k)], & 1 \leq k \leq N-1 \end{cases} \qquad (40)$$

From formula (37), Z(0)=R(0)+jI(0). Observe that R(0) and I(0) are both real since the r(n)'s and i(n)'s are real data streams. Consequently, R(0)=Re(Z(0)) and I(0)=Im(X(0)). In summary, $$R(k) = \begin{cases} \dfrac{1}{2}[Z(k) + Z(N-k)], & 1 \leq k \leq N-1 \\ Re(Z(0)), & k = 0 \end{cases} \qquad (41)$$

$$I(k) = \begin{cases} \dfrac{1}{2j}[Z(k) - Z(N-k)], & 1 \leq k \leq N-1 \\ Im(Z(0)), & k = 0 \end{cases}$$

Using the subscript r to denote the operation of taking the real part of a complex number and the subscript i to denote the operation of taking the imaginary part of a complex number formula (41) becomes $$R_r(k)=\tfrac{1}{2}[Z_r(k)+Z_r(N-k)], 1\leq k\leq N-1$$

$$R_i(k)=\tfrac{1}{2}[Z_i(k)-Z_i(N-k)], 1\leq k\leq N-1$$

$$R_r(0)=Z_r(0), R_i(0)=0$$

$$I_r(k)=\tfrac{1}{2}[Z_i(k)+Z_i(N-k)], 1\leq k\leq N-1$$

$$I_i(k)=\tfrac{1}{2}[Z_r(N-k)-Z_r(k)], 1\leq k\leq N-1$$

$$I_r(0)=Z_i(0), I_i(0)=0 \qquad (42)$$

b. The inverse direction.

From the two N point Forward Discrete Fourier Transform sequences R(0), R(1), ..., R(N−1) and I(0), I(1), ..., I(N−1), we can recover the two real data streams r(0), r(1), ..., r(N−1) and i(0), i(1), ..., i(N−1) with one N point Inverse Discrete Fourier Transform.

Form a complex N point data stream $$Z(k)=R(k)+jI(k), 0\leq k\leq N-1 \qquad (43)$$

Apply an N point Inverse Discrete Fourier Transform to the Z(k)'s of formula (43). Since the N point Inverse Discrete Fourier Transform is a linear transform, it follows that $$z(n)=r(n)+ji(n), 0\leq k\leq N-1 \qquad (44)$$

Since the r(n)'s and i(n)'s are real, they are uniquely determined by formula (44).

Formula (43) can be rewritten as $$Z_r(k)=R_r(k)-I_i(k), 0\leq k\leq N-1$$

$$Z_i(k)=R_i(k)+I_r(k), 0\leq k\leq N-1 \qquad (45)$$

E. Evaluating two N point Discrete Cosine Transforms simultaneously when the data streams are real.

One method applies to real data streams o any size. Our method does not depend on whether or not N is a power of 2; in fact, N does not have to be even. Our method takes advantage f the method described in section C. For the evaluation of a single N point Discrete Cosine Transform by means of an N point Discrete Fourier Transform. Our method also takes advantage of the method described in section D. for the simultaneous evaluation of two N point Discrete Fourier Transforms.

Let $r_{init}(n)$ and $i_{init}(n)$, $0 \leq n \leq N-1$ denote two real N point data streams, i.e., our two initial N point real sequences are $$\begin{cases} r_{init}(0), r_{init}(1) \ldots r_{init}(N-1) \\ i_{init}(0), i_{init}(1) \ldots i_{init}(N-1) \end{cases} \quad (46)$$

a. The forward direction.

We scramble each of the real N point data streams in formula (46) according to the prescription that is expressed in formulas (21), (20) and (17). Let $r(n)$, $0 \leq n \leq N-1$ denote the real N point data stream obtained by scrambling the data stream $r_{init}(n)$, $0 \leq n \leq N-1$ in such a manner. This scrambling is performed by the scrambler apparatus 16 (FIG. 2). Similarly, let $i(n)$, $0 \leq n \leq N-1$ denote the real N point data stream obtained by scrambling the data stream $i_{init}(n)$, $0 \leq n \leq N-1$ in the same manner. This scrambling is performed by the scrambler apparatus 18 (FIG. 2). For convenience, we list these two scrambled data streams:

$$\begin{cases} r(0), r(1) \ldots r(N-1) \\ i(0), i(1) \ldots i(N-1) \end{cases} \quad (47)$$

Form the complex N point data stream $$z(n) = r(n) + ji(n), \quad 0 \leq n \leq N-1 \quad (48)$$

Let R(k), I(k) and Z(k), $0 \leq k \leq N-1$ denote the N point Forward Discrete Fourier Transforms of the r(n)'s, i(n)'s and z(n)'s respectively. From section C. and in particular, formula (28) of section C., the N point Forward Discrete Cosine Transform of the $r_{init}(n)$'s of formula (46) is given by $$C_1(k) = 2Re(R(k) \, W_{2n}^{\frac{k}{2}}), \quad 0 \leq k \leq N-1 \quad (49)$$

Similarly, the N point Forward Discrete Cosine Transform of the $i_{init}(n)$'s of formula (46) is given by $$C_2(k) = 2Re(I(k) \, W_{2n}^{\frac{k}{2}}), \quad 0 \leq k \leq N-1 \quad (50)$$

However, the R(k)'s and I(k)'s can be expressed as in formula (41) of section D., that is, in terms of the Z(k)'s. In other words, one N point Forward Discrete Fourier Transform of the z(n)'s of formula (48) has resulted int he simultaneous evaluations of the N point Forward Discrete Cosine Transforms of the two real data streams which appear in formula (46), namely the $r_{init}(n)$'s and the $i_{init}(n)$'s.

Formulas (51) and (52) result from direct substitution of the first three equalities of formula (42) into formula (49). Formulas (53) and (54) result from a similar substitution of the last three equalities of formula (42) into formula (50).

$$C_1(k) = [Z_r(k) + Z_r(N-k)]\cos\left(\frac{\pi k}{2N}\right) + \quad (51)$$
$$[Z_i(k) - Z_i(N-k)]\sin\left(\frac{\pi k}{2N}\right),$$
$$1 \leq k \leq N-1$$

$$C_1(0) = 2Z_r(0) \quad (52)$$

$$C_2(k) = [Z_i(k) + Z_i(N-k)]\cos\left(\frac{\pi k}{2N}\right) + \quad (53)$$
$$[Z_r(N-k) - Z_r(k)]\sin\left(\frac{\pi k}{2N}\right),$$
$$1 \leq k \leq N-1$$

$$C_2(0) = 2Z_i(0) \quad (54)$$

The forward folder apparatus 36 (FIG. 3) provides $Z_r(k)$, $Z_i(k)$, $Z_r(N-k)$ and $Z_i(N-k)$ to the separator apparatus 46 (FIG. 4) which uses them to implement formulas (51), (52), (53) and (54).

b. The inverse transform.

We first observe that formula (35) can be rewritten (by means of formula (29)) as $$S(k) = \begin{cases} \frac{1}{2}[C(k)W_{2N}^{-\frac{k}{2}} + C(N-k)W_{2N}^{\frac{N-k}{2}}], & 1 \leq k \leq N-1 \\ \frac{1}{2}C(0), & k = 0 \end{cases} \quad (55)$$

Formula (55) expresses the S(k)'s directly in terms of the C(k)'s. Formula (55) can be re-expressed as formulas (56), (57) and (58):

$$S_r(k) = \frac{1}{2}\left[C(k)\cos\left(\frac{\pi k}{2N}\right) + C(N-k)\cos\left(\frac{\pi(N-k)}{2N}\right)\right], \quad (56)$$

$$S_i(k) = \frac{1}{2}\left[C(k)\sin\left(\frac{\pi k}{2N}\right) - C(N-k)\sin\left(\frac{\pi(N-k)}{2N}\right)\right], \quad (57)$$

$$1 \leq k \leq N-1$$

$$S_r(0) = \frac{1}{2}C(0), \quad S_i(0) = 0 \quad (58)$$

The inverse folder apparatus 56 and inverse folder apparatus 58 (FIG. 5) provides C(k) and C(N−k) to the trigonometric unit apparatus 68 and trigonometric unit apparatus 70 (FIG. 6) which implements formulas (56), (57) and (58).

We now develop the simultaneous evaluation of the N point Inverse Discrete Cosine Transform of the two real sequences $C_1(0), C_1(1), \ldots, C_1(N-1)$ and $C_2(0), C_2(1), \ldots, C_2(N-1)$. We perform this evaluation by backtracking on the steps which led up to formulas (49), (50) and appropriately undoing each step.

We can recover the R(k)'s which determined the $C_1(k)$'s of formula (49) by means of formula (55). However, we need a more explicit representation of the R(k)'s, so we will use formulas (56), (57) and (58).

$$R_r(k) = \tag{59}$$
$$\frac{1}{2}\left[C_1(k)\cos\left(\frac{\pi k}{2N}\right) + C_1(N-k)\cos\left(\frac{\pi(N-k)}{2N}\right)\right],$$

$$R_i(k) = \tag{60}$$
$$\frac{1}{2}\left[C_1(k)\sin\left(\frac{\pi k}{2N}\right) - C_1(N-k)\sin\left(\frac{\pi(N-k)}{2N}\right)\right],$$

$$1 \leq k \leq N-1$$

$$R_r(0) = \frac{1}{2}C_1(0), R_i(0) = 0 \tag{61}$$

Similarly, to recover the I(k)'s which determined the $C_2(k)$'s of formula (50), we again use formulas (56), (57) and (58).

$$I_r(k) = \tag{62}$$
$$\frac{1}{2}\left[C_2(k)\cos\left(\frac{\pi k}{2N}\right) + C_2(N-k)\cos\left(\frac{\pi(N-k)}{2N}\right)\right],$$

$$1 \leq k \leq N-1$$

$$I_i(k) = \tag{63}$$
$$\frac{1}{2}\left[C_2(k)\sin\left(\frac{\pi k}{2N}\right) - C_2(N-k)\sin\left(\frac{\pi(N-k)}{2N}\right)\right],$$

$$1 \leq k \leq N-1$$

$$I_r(0) = \frac{1}{2}C_2(0), I_i(0) = 0 \tag{64}$$

For ease of presentation, formula (43) as well as its more explicit representation, namely formulas (45) are written down again:

$$Z(k) = R(k) + jI(k), 0 \leq k \leq N-1 \tag{43}$$

$$Z_r(k) = R_r(k) - I_i(k), 0 \leq k \leq N-1$$

$$Z_i(k) = R_i(k) + I_r(k), 0 \leq k \leq N-1 \tag{45}$$

We next reconstruct the Z(k)'s as expressed in formula (43) by substituting the $R_r(k)$'s, $R_i(k)$'s, $I_r(k)$'s and $I_i(k)$'s of formulas (59) through (64) into formula (45). This is implemented by the mixer apparatus 80 (FIG. 7). Then we apply an N point Inverse Discrete Fourier Transform to the sequence Z(0), Z(1), ..., Z(N−1): This recovers the N point sequence z(0), z(1), ..., z(N−1) of formula (48). Next we unscramble the r(n)'s of formula (48) by means of formula (36) to recover the $r_{init}(n)$'s of formula (46). We also unscramble the i(n)'s of formula (48) by means of formula (36) to recover the $i_{init}(n)$'s of formula (46).

As a final note, we observe that the R(k)'s of formula (59) and the $I_r(k)$'s of formula (62) have even symmetry, i.e., $$R_r(N-k) = R_r(k), 1 \leq k \leq N-1 \tag{65}$$

$$I_r(N-k) = I_r(k), 1 \leq k \leq N-1 \tag{66}$$

We also observe that the $R_i(k)$'s of formula (60) and the $I_i(k)$'s of formula (63) have odd symmetry, i.e., $$R_i(N-k) = -R_i(k), 1 \leq k \leq N-1 \tag{67}$$

$$I_i(N-k) = -I_i(k), 1 \leq k \leq N-1 \tag{68}$$

These symmetries (as expressed in formulas (65) through (68)) are used to advantage in the inverse folder apparatus 56 and the inverse folder apparatus 58 (FIG. 5) since only one half the set of $R_r(k)$'s, $I_r(k)$'s, $R_i(k)$'s and $I_i(k)$'s need be generated; the rest can be derived from symmetries. Thus the inverse folders only generate the first half of the data set. As a result, each Z(k) and corresponding Z(N−k) are produced simultaneously from the mixer apparatus 80 (FIG. 7). The sequencer apparatus 90 (FIG. 8) takes in Z(k) and Z(N−k) and outputs the Z(k)'s in the correct order, i.e., Z(0), Z(1), Z(2) ... Z(N−1), one per cycle.

It will be apparent to those skilled in the art that many of the formulas of the algorithm described above are implemented in the trigonometric units 68 and 70, mixer 80, and unscramblers 110 and 112. Thus, these trigonometric units implement formulas 56, 57, and 58. Thus, mixer 80 implements formulas 43 and 45. Thus, unscramblers 110 and 112 implement formula 36.

It will be apparent to those skilled in the art that applicants' apparatus may be constructed out of many prior art components. Thus, such prior art components are described in, e.g., U.S. Pat. Nos. 5,008,848 (which discloses an adder/subtractor), 4,984,188 (which discloses a latch), 4,894,713 (which discloses a memory buffer), 4,841,464 (which discloses a cosine transformer), 4,837,724 (which discloses a cosine transformer), 4,831,574 (which discloses a cosine transformer), 4,999,799 (which discloses a fourier transformer), 4,970,674 (which discloses a DFT apparatus), 4,825,399 (which discloses a fourier transformer), and the like; the disclosure of each of these patent applications is hereby incorporated by reference into this specification.

Many of the components of applicants' device are also described in other publications such as, e.g., (1) Forest M. Mims III "Understanding Digital Computers," Second Edition (Radio Shack, Fort Worth, Tex., 1987), (2)Don Lancaster's "TTL Cookbook" (Macmillan Computer Publishing Company, 11711 North College, Carmel, Ind., 1974), the "1991 IC Master," Volumes 1, 2, and 3 (Hearst Business Communications, Inc., 645 Stewart Avenue, Garden City, Long Island, N.Y. 11530), and the like.

By way of illustration, one may build one embodiment of applicants' device 10 out of some or all the components listed below. In this illustration, it is assumed that the preformatted input onto lines 12 and 14 is D bits wide (per number) and the formatted input on lines 28 and 30 is K bits wide (per number) and that to hold the number N (the number of inputs per line) requires B bits in a binary representation. Furthermore, in this illustration "TTL" stands for transistor transistor logic, a medium scale integrated circuit technology that was extremely popular for circuit design in the 1970's and 1980's. The numbers assigned by the Texas Instruments company to many of the devices have become industry wide standards for reference to certain of the most popular of these devices.

It will be apparent to those skilled in the art, upon reading this illustration, that we are describing only a single possible embodiment for device 10 and that many other embodiments are also possible. Thus, it will be apparent that, for example, the entire device can be designed as a single very large scale integrated (VLSI) device.

In this illustration, the switches (such as, e.g., switches 130, 132, etc.) that feed the index latches (such as latches 140 and 146) require B/4 TI74157 TTL devices. The switches (such as switch 128) that feed the (un)Scrambler output connector require D/4 TI74157 TTL devices. The switches (such as switches 204, 308, etc.) that feed the other output connectors require K/4 TI74157 TTL devices for each output line they control. As a general rule, in this illustration, the switches that decide between two data paths need ¼ of the number of bits in the data path as devices.

Furthermore, in this illustration, the distributor (such as, e.g., distributor 126, 202, 306, etc.) may be implemented by a connection to the write enable of the TI7489 TTL memory devices.

In this illustration, the memory arrays may be implemented by TI7489 TTL memory devices and TI7405 TTL devices.

The index latches used in this illustration, such as index latches 140, 146, 216, etc., may be implemented by B/6 TI74174 TTL devices.

The data latches used in this embodiment, such as data latches 138, 142, 212, and the like, may be implemented by TI74174 TTL devices.

In this embodiment, each of the registers (such as register 158, 228, 348, etc.) holds the value of N and it requires B/6 TI74174 TTL devices.

The scrambler random access memory 154 ("scrambler can be implemented by (B*N)/64 TI7489 TTL memory devices.

The cosine random access memory 240 can be implemented by (K*N)/64 TI7489 TTL memory devices.

The sine random access memory 242 can be implemented by (K*N)/64 TI7489 TTL memory devices.

The "RAM 1" 370, "RAM 2" 372, "RAM 3" 374, and "RAM 4" 376 may all be implemented by (K*[N+2])/128 TI7489 TTL memory devices.

The incrementors (such as incrementors 152, 194, and 352) can be implemented by B/4 TI74161 TTL devices, B/4 TI7486 TTL devices, and B/3 TI7437 TTL devices.

The substractors (such as, e.g., subtractors 198 and 354) can be implemented by B/4 TI74181 TTL devices.

The comparator 200 can be implemented by B/3 TI7437TTL devices and B/4 TI7486 TTL devices and B/4 TI7408 TTL devices.

The master controllers (such as, e.g., "Which" devices 150, 196, 350, etc.) can be implemented by a single TI7476 device.

The Router 440 can be implemented by B/4 TI74181 TTL devices.

In this illustration, certain of the hardware to be used will depend on the data format for real numbers expected by the Fourier Transformer 31, the Inverse Fourier Transformer 97, and the Application hardware 51. We assume here that a real number of the form x times $2^y$ ( wherein x is between 0 and 1, y is an integer) is expressed using a single bit for the sign, a set of E bits which represent the exponent, y, as an integer, and a set of F bits which are used to represent x. We also assume that the input on line 12 is integers. We also assume here that D and F are less than or equal to 32.

In this illustration, and given the assumptions described above, the format converters (such as converters 24 and 26) can be implemented with (D/8)+1 TI74148 TTL devices, (5*D)/4 TI74157 TTL devices and E/4 TI74181 TTL devices. The adders (such as, e.g., adders 412 and 414 and 394) can be implemented with (3*E)/4 TI74181 TTL devices, (7*D)/4 TI74157 TTL devices, D/4 TI74181 TTL devices, (D/8)+1 TI74148 TTL devices, (5*D)/4 TI74157 TTL devices and E/4 TI74181 TTL devices. The multipliers (such as, e.g., multipliers 386, 388, 390, and the like) can be implemented with E/4 TI74181 TTL devices, 1 TI7486 TTL device, and an integer multiplier. Some suitable integrer multipliers may be found, e.g., on page 244 of Volume 1 of the aforementioned IC Master 1991 which, in addition to listing said integer multipliers, also describes an FFT processor, Block Floating Point Chipset.

In this aspect of the illustration the negators (such as negators 268 and 270) can be implemented with one TI7405 TTL device. The differencers (such as, e.g., differencers 410 and 416) can be implemented with (3*E)/4 TI74181 TTL devices, (7*D)/4 TI74157 TTL devices, D/4 TI74181 TTL devices, (D/8)+1 TI74148 TTL devices, (5*D)/4 TI74157 TTL devices and E/4 TI74181 TTL devices.

It is to be understood that the aforementioned description is illustrative only and that changes can be made in the apparatus, in the ingredients and their proportions, and in the sequence of combinations and process steps, as well as in other aspects of the invention discussed herein, without departing from the scope of the invention as defined in the following claims.

We claim:

1. An apparatus for utilizing a discrete Fourier transformer in order to implement a discrete cosine transformer, wherein said apparatus is comprised of:
   (a) a discrete Fourier transformer;
   (b) a first scrambler for rearranging a first real input data stream;
   (c) first feeding means for feeding a first real input data steam to said first scrambler;
   (d) a second scrambler for rearranging a second real input data stream;
   (e) second feeding means for feeding a second real input data stream to said second scrambler; and
   (f) converting means for converting a complex data stream output from said discrete Fourier transformer into a first stream of discrete cosine transformed data and a second stream of discrete cosine transformed data, wherein:
      1. said first stream of discrete cosine transformed data is the discrete cosine transform of said first real input data stream,
      2. said second stream of discrete cosine transformed data is the discrete cosine transform of sad second real input data stream, and
      3. said converting means is electrically connected to said discrete Fourier transformer.

2. The apparatus as recited in claim 1, wherein said apparatus is comprised of: (a) a means for modifying said first stream of discrete cosine transformed data and for producing a first modified data stream, (b) a third feeding means for feeding said first stream of discrete cosine transformed data into said means for modifying said first stream of discrete cosine transformed data and for producing a first modified data stream and (c) a fourth feeding means for feeding said second stream of discrete cosine data into said means for modifying said second stream of discrete cosine transformed data and for producing a second modified stream of data.

3. The apparatus as recited in claim 2, wherein said apparatus is comprised of a means for converting said first modified data stream, thereby producing a first converted data stream.

4. The apparatus as recited in claim 3, wherein said apparatus is comprised of a means for converting said second modified data stream, thereby producing a second converted data stream.

5. The apparatus as recited in claim 4, wherein said apparatus is comprised of means for combining said first modified data stream and said second modified data stream to produce a complex data stream.

6. The apparatus as recited in claim 5, wherein said apparatus is comprised of an inverse discrete fourier transformer and means for feeding said complex data stream into said inverse discrete fourier transformer which is adapted to produce a first inverse transform and a second inverse transform.

7. The apparatus as recited in claim 6, wherein said apparatus is comprised of a first format converter and means for feeding such inverse transform to said first format converter.

8. The apparatus as recited in claim 7, wherein said apparatus is comprised of a second format converter and means for feeding said second inverse transform to said second format converter.

9. The apparatus as recited in claim 8, wherein said first format converter produces a first data stream with a modified format.

10. The apparatus as recited in claim 9, wherein said second format converter produces a second data stream with a modified format.

11. The apparatus as recited in claim 10, wherein said apparatus is comprised of a first unscrambler which is electrically connected to said first format converter 12. The apparatus as recited in claim 11, wherein said apparatus is comprised of a second unscrambler which is electrically connected to said second format converter.

* * * * *